US008452678B2

(12) United States Patent
Feldman et al.

(10) Patent No.: US 8,452,678 B2
(45) Date of Patent: May 28, 2013

(54) SYSTEM AND METHOD FOR ADMINISTERING AN ADVANCED INSURANCE COMPONENT-BASED PRODUCT

(75) Inventors: Julia M. Feldman, West Hartford, CT (US); Sankar Virdhagriswaran, Boxborough, MA (US); James Allan Tarbell, Windsor Locks, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 184 days.

(21) Appl. No.: 12/732,529

(22) Filed: Mar. 26, 2010

(65) Prior Publication Data
US 2011/0153369 A1 Jun. 23, 2011

Related U.S. Application Data

(60) Provisional application No. 61/289,093, filed on Dec. 22, 2009.

(51) Int. Cl.
*G06Q 40/00* (2012.01)
*G06Q 40/08* (2012.01)
(52) U.S. Cl.
USPC ............................... 705/35; 705/4; 705/36 R
(58) Field of Classification Search
CPC .................................. G06Q 40/00; G06Q 40/08
USPC ...... 705/4, 35, 36 R, 3, 2, 26.1; 707/999.107, 707/999.01, 999.104; 715/700; 1/1
See application file for complete search history.

(56) References Cited

U.S. PATENT DOCUMENTS

| | | | |
|---|---|---|---|
| 7,054,864 B1 * | 5/2006 | Toomey ............................... 1/1 |
| 7,107,239 B2 * | 9/2006 | Graff .......................... 705/36 R |
| 7,137,043 B1 * | 11/2006 | Kane et al. ...................... 714/57 |
| 7,178,020 B2 * | 2/2007 | DiRienzo ...................... 713/153 |
| 7,334,730 B1 * | 2/2008 | Factor et al. .................. 235/384 |
| 7,451,097 B1 | 11/2008 | Faupel et al. |
| 7,509,536 B1 * | 3/2009 | Kane et al. ...................... 714/46 |
| 7,617,240 B2 * | 11/2009 | Guyan et al. ..................... 705/1.1 |
| 7,752,106 B1 * | 7/2010 | Corby et al. .................... 705/35 |
| 7,844,477 B2 * | 11/2010 | Bonissone et al. ............... 705/4 |
| 7,882,548 B2 * | 2/2011 | Heath et al. ....................... 726/5 |
| 8,024,203 B2 * | 9/2011 | Kendall et al. ................... 705/4 |
| 2002/0165739 A1 * | 11/2002 | Guyan et al. ..................... 705/4 |
| 2002/0194035 A1 * | 12/2002 | DiRienzo ........................ 705/4 |

(Continued)

OTHER PUBLICATIONS

Anonymous "Insurance market update" Apr. 1995, Rough Notes v138n4 pp. 76-77.*

(Continued)

*Primary Examiner* — Kelly Campen
(74) *Attorney, Agent, or Firm* — Howard IP Law Group, PC

(57) ABSTRACT

A system may include an insurance component selection platform that transmits data to and receives data from an insurance product component storage unit storing one or more self-descriptive components of an insurance coverage. Each of the stored components may have associated properties defining attributes of the component and one or more values associated with the properties. The components may be selected via a graphical interface generated by the component selection platform to be included in an insurance coverage product. The components may then be combined within constraints of the properties and values of the individual components. An insurance coverage policy may then be presented based on the combination of components.

28 Claims, 39 Drawing Sheets

U.S. PATENT DOCUMENTS

| | | |
|---|---|---|
| 2003/0023473 A1* | 1/2003 | Guyan et al. ............... 705/9 |
| 2003/0145124 A1* | 7/2003 | Guyan et al. ............... 709/318 |
| 2003/0154172 A1* | 8/2003 | Guyan et al. ............... 705/80 |
| 2003/0187699 A1* | 10/2003 | Bonissone et al. ........... 705/4 |
| 2003/0187700 A1* | 10/2003 | Bonissone et al. ........... 705/4 |
| 2004/0044763 A1* | 3/2004 | Besson ..................... 709/224 |
| 2004/0085357 A1* | 5/2004 | Childress et al. ........... 345/762 |
| 2004/0088195 A1* | 5/2004 | Childress et al. ........... 705/4 |
| 2004/0088196 A1* | 5/2004 | Childress et al. ........... 705/4 |
| 2004/0088197 A1* | 5/2004 | Childress et al. ........... 705/4 |
| 2004/0088198 A1* | 5/2004 | Childress et al. ........... 705/4 |
| 2004/0088199 A1* | 5/2004 | Childress et al. ........... 705/4 |
| 2004/0187013 A1* | 9/2004 | Heath et al. ............... 713/200 |
| 2005/0108064 A1* | 5/2005 | Castleman et al. ........... 705/4 |
| 2005/0187830 A1* | 8/2005 | Grear et al. ............... 705/26 |
| 2005/0289272 A1* | 12/2005 | Masuoka et al. ............. 710/260 |
| 2006/0020444 A1* | 1/2006 | Cousineau et al. ........... 704/1 |
| 2006/0293980 A1* | 12/2006 | Corby et al. ............... 705/35 |
| 2007/0067832 A1* | 3/2007 | Heath et al. ............... 726/5 |
| 2008/0091476 A1* | 4/2008 | Graff ...................... 705/4 |
| 2008/0109378 A1* | 5/2008 | Papadimitriou .............. 705/36 R |
| 2008/0201172 A1* | 8/2008 | McNamar ................... 705/3 |
| 2008/0255862 A1* | 10/2008 | Bailey et al. .............. 705/1 |
| 2009/0076861 A1* | 3/2009 | Saunders ................... 705/4 |
| 2010/0030581 A1* | 2/2010 | Factor et al. .............. 705/4 |
| 2011/0153369 A1* | 6/2011 | Feldman et al. ............. 705/4 |
| 2011/0246243 A9* | 10/2011 | Graff ...................... 705/4 |

OTHER PUBLICATIONS

Anonymous "The Allstate Corporation at the Annual AIFA Conference—Final" Mar. 6, 2006 Fair Disclosure Wire pp. n/a.*

* cited by examiner

| COMPONENT IDENTIFIER 502 | DESCRIPTION IDENTIFIER 504 | RULES 506 | PRICING/RISK INFORMATION 508 | STATUS 510 |
|---|---|---|---|---|
| COM_1001 | D_1001 | NOT IF NY, CA, OR CT | 10% | ACTIVE |
| COM_1002 | D_1002 | R_101 | 10%, 5% IF WITH COM_1002 | ACTIVE |
| COM_1003 | D_1003 | R_102; R_109 | $1000 | ACTIVE |
| COM_1004 | D_1004 | R_101 | P_1001 | EXPIRED |
| COM_1005 | D_1005 | NONE | 10% | EXPIRED |

[ Selected General Conditions Components output. ]

F. PROPERTY GENERAL CONDITIONS — 1994

1. Control of Property

Any act or neglect of any person other than you beyond your direction or control will not affect this insurance. The breach of any condition of this Coverage Form at one or more locations will not affect coverage at any location where, at the time of phy

2. No Benefit to Bailee

No person or organization, other than you, having custody of Covered Property will benefit from this insurance.

3. Policy Period, Coverage Territory

Under this form:

a. We cover physical loss or physical damage commencing:

(1) During the policy period shown in the Declarations; and

(2) Within the coverage territory.

But we do not cover physical loss or physical damage that is also covered by a preceding policy.

b. The coverage territory is:

(1) The United States of America (including its territories and possessions);

(2) Puerto Rico; and

(3) Canada.

[ Appropriate definition components outputted based upon rules and selected ]

G. PROPERTY DEFINITIONS — 1996

1. "Data" means information or facts stored in a computer's memory, on "software" or on media.

2. "Manager" means a person serving in a directorial capacity for a limited liability company.

3. "Member" means an owner of a limited liability company repres

4. "Operations" means your business activities occurring at the "scheduled premises" and tenantability of the "scheduled premises".

5. "Period of Restoration" means the period of time that:

a. Begins with the date of direct physical loss or physical damage caused by or resulting from a Covered Cause of Loss at the "scheduled premises", and b. Ends on the date when:

(1) The property at the "scheduled premises" should be repaired, rebuilt or replaced with reasonablespeed and similar quality;

(2) The date when your business is resumed at a new, permanent location.

"Period of Restoration" does not include any increased period required due to enforcement of any law that:

a. Regulates the construction, use or repair or required the tearing down of any property; or b. Regulates the prevention, control, repair, clean up or restoration of environmental damage.

The expiration date of this policy will not cut short the "period of restoration".

FIG. 19C

Custom Property for

Outpatient Healthcare

[Custom name outputted here is the name of the program.]

Various provisions in this policy restrict coverage. Read the entire policy carefully to determine rights, duties, and what is and is not covered.

Other words and phrases that appear in quotation marks have special meaning. Refer to the SECTION G - PROPERTY DEFINITIONS.

[Property insuring agreement component selected is far broader providing coverage anywhere in the coverage territory, not just at "scheduled premises" and not limiting coverage to physical loss or physical damage thus extending coverage to loss of intangible property such as data for example.]

[Custom Section Name output as Additional Coverages based on components selected:]

[Selected Additional Coverage components are relevant to chosen Limitations and tailored specifically to OHC (see italicized)]

A. COVERAGE

We will pay for loss of or damage to Covered Property located anywhere within the Coverage Territory, caused by or resulting from a Covered Cause of Loss.

1. Covered Property

Covered Property as used in this policy, means the following types of property for which a Limit of Insurance is shown in the Declarations:

Business Personal Property including:

a. Property you own that is used in your business; and b. Property of others that is in your care custody and control c. Leased property which you are obligated to insure.

[While numerous options are available, only BPP is selected; however, Leased property is added to the definition of BPP broadening coverage.]

2. Property Not Covered

Covered Property does not include:

a. Aircraft, automobiles, motor trucks and other vehicles subject to motor vehicle registration;

b. Contraband, or property in the course of illegal transportation or trade;

[Selected property types are specified as not included and output in this section. This instance does not select "Valuable Papers & Records" as property not covered providing broader coverage reaching into intangible property.]

[Selected Covered Causes of Loss is the broadest, Special Causes of Loss. Per output rules, this selection will require some Exclusions; however, the causes of loss will only be limited by the Exclusions - far broader than the HBB example.]

3. Covered Causes of Loss

RISKS OF DIRECT PHYSICAL LOSS unless the loss is:

a. Excluded in Section B., EXCLUSIONS; or b. Limited in Paragraph A.4., Limitations.

4. Limitations a. We will not pay for direct loss of or damage to property that is missing, where the only evidence of the direct physical loss or physical damage is a shortage disclosed on taking inventory, or other instances where there is no physical evidence to show b. The interior of any building or structure caused by or resulting from rain, snow, sleet, ice, sand, dust, whether driven by wind or not, unless:

(1) The building or structure first sustains physical damage by a Covered Cause of Loss to its roof or walls through which the rain, snow, sleet, ice, sand or dust enters; or (2) The loss or damage is caused by or results from thawing c. Unless specifically provided for under Additional Coverages with a specific Limit of Insurance in the Declarations, we will not pay for loss or damage to perishable stock due to a change in temperature or humidity.

[Limitations play a crucial role in defining the exposure taken on by the carrier based upon the breadth of the Insuring Agreement and the Cause of Loss Selection.]

[Using same Exclusion components under the broader insuring agreement and Cause of Loss has the effect of providing broad coverage. Without the use of additional exclusions, most causes of loss will be covered vs. the HBB form where the limited number of exclusions does not serve to expand coverage.]

5. Additional Coverages a. Business Income

(1) We will pay for the actual loss of Business Income you sustain due to the necessary suspension of your "operations" during the "period of restoration". The susp (2) We will only pay for loss of Business Income that occurs within 12 consecutive months after the date of loss or damage.

(3) Business Income means the:

(a) Net Income (Net Profit or Loss before income taxes) that would have been earned or incurred if no direct physical loss or physical damage had occurred; and (b) Continuing normal operating expenses incurred, including payroll.

(4) In calculating Business Income loss, no reductions will be made for discontinuing expenses or *rescheduled patients* for the initial 30 days of loss.

(5) We shall count each portion of a day b. Temperature Change

We will pay for loss or damage to perishable stock resulting from a change in temperature or humidity due to mechanical breakdown or power service interruption subject to the Limit of Insurance indicated in the Declarations.

B. EXCLSNS

[Concurrent contribution lead in language is output based upon selected components for exclusion.]

1. We will not pay for loss or damage caused directly or indirectly by any of the following. Such loss or damage is excluded regardless of any other cause or event that contributes concurrently or in any sequence to the loss.

a. Nuclear Hazard

Nuclear reaction or radiation, or radioactive contamination however caused. But if physical loss or damage by fire results, we will pay for that resulting b. War and Military Action

(1) War, including undeclared or civil war;

(2) Warlike action by a military force, including action in hindering or defending against an actual or expected attack, by any government, sovereign or other authority using military personnel or other agents; or (3) Insurrection, rebellion, revolution, usurped power, or action taken by governmental authority in hindering or defending against any of these.

[Selected General Conditions Components output.]

F. PROPERTY GENERAL CONDITIONS

1. Control of Property

Any act or neglect of any person other than you beyond your direction or control will not affect this insurance. The breach of any condition of this Coverage Form at one or more locations will not affect coverage at any location where, at the time of phy

2. No Benefit to Bailee

No person or organization, other than you, having custody of Covered Property will benefit from this insurance.

3. Policy Period, Coverage Territory

Under this form:

a. We cover physical loss or physical damage commencing:

(1) During the policy period shown in the Declarations; and (2) Within the coverage territory.

[Definition of Coverage Territory can expand or restrict coverage due to the selected Insuring Agreement.]

But we do not cover physical loss or physical damage th also covered by a preceding policy.

b. The coverage territory is:

(1) The United States of America (including its territories and possessions);

(2) Puerto Rico; and (3) Canada.

G. PROPERTY DEFINITIONS

[Appropriate definition components outputted based upon rules and selected product components.]

1. "Manager" means a person serving in a directorial capacity for a limited liability company.

2. "Member" means an owner of a limited liability company repres

3. "Operations" means your business activities occurring at the "scheduled premises" and tenantability of the "scheduled premises".

4. "Period of Restoration" means the period of time that:

a. Begins with the date of direct physical loss or physical damage caused by or resulting from a Covered Cause of Loss at the "scheduled premises", and b. Ends on the date when:

(1) The property at the "scheduled premises" should be repaired, rebuilt or replaced with reasonablespeed and similar quality;

(2) The date when your business is resumed at a new, permanent location.

"Period of Restoration" does not include any increased period required due to enforcement of any law that:

a. Regulates the construction, use or repair or required the tearing down of any property; or b. Regulates the prevention, control, repair, clean up or restoration of environmental damage.

The expiration date of this policy will not cut short the "period of restoration".

FIG. 20C

| Component Name 2105 | Language Text 2120 | Product Rules 2125 | Rating Base 2130 | Rating Algorithm 2135 | Rating Rules 2140 | Lmt Optns 2145 | Rate/Factor Value 2150 |
|---|---|---|---|---|---|---|---|
| Physical Loss or Damage Insuring Agreement - Scheduled Premises | We will pay for direct physical loss of or physical damage to Covered Property at the premises described in the Declarations (also called "scheduled premises" in this policy) caused by or resulting from a Covered Cause of Loss. | 1. Outputs onto Custom Property Template, form SS XX XX. Section A. 2. Requires the use of Property components. 3. Requires output of "scheduled premises" definition | NA | Factor applied to rating of included coverage components | Identify appropriate factor from table and apply to rating algorithm for included Property Coverage Components | NA | By coverage, occupancy, territory, protection class table, 1.00 factor applied to coverage component rating |
| Loss or Damage Insuring Agreement - Scheduled Premises | We will pay for loss of or damage to Covered Property at the premises described in the Declarations (also called "scheduled premises" in this policy) caused by or resulting from a Covered Cause of Loss. | 1. Outputs onto Custom Property Template, form SS XX XX. Section A. 2. Requires the use of Property components. 3. Requires output of "scheduled premises" definition | NA | Factor applied to rating of included coverage components | Identify appropriate factor from table and apply to rating algorithm for included Property Coverage Components | NA | By coverage, occupancy, territory, protection class table, 1.10 factor applied to coverage component rating |
| Physical Loss or Damage Insuring Agreement - Coverage Territory | We will pay for loss of or physical damage to Covered Property located anywhere within the Coverage Territory, caused by or resulting from a Covered Cause of Loss. | 1. Outputs onto Custom Property Template, form SS XX XX. Section A. 2. Requires the use of Property components. | NA | Factor applied to rating of included coverage components | Identify appropriate factor from table and apply to rating algorithm for included Property Coverage Components | NA | By coverage, occupancy, territory, protection class table, 1.05 factor applied to coverage component rating |
| Loss or Damage Insuring Agreement - Coverage Territory | We will pay for loss of or damage to Covered Property located anywhere within the Coverage Territory, caused by or resulting from a Covered Cause of Loss. | 1. Outputs onto Custom Property Template, form SS XX XX. Section A. 2. Requires the use of Property components. | NA | Factor applied to rating of included coverage components | Identify appropriate factor from table and apply to rating algorithm for included Property Coverage Components | NA | By coverage, occupancy, territory, protection class table, 1.15 factor applied to coverage component rating |

| 2105 | 2120 | 2125 | 2130 | 2135 | 2140 | 2145 | 2150 |
|---|---|---|---|---|---|---|---|
| Cause of Loss - Fire | Fire. | 1. Outputs onto Custom Property Template, form SS XX XX, Section A.3 or Section B. EXCLUSIONS; may not be output in both. 2. Requires the use of a Property Insuring Agreement | Limit/100 of selected coverage component | Follows rating of selected coverage component (Bldg, BPP, BI) | Identify appropriate rating formula from Property Type coverage component rule set and insert Fire rate from table into Base Rate promulgation. | Coverage component limit | By occupancy, territory table select appropriate rate: Bldg: X.XX BPP: X.XX BI: X.XX |
| Cause of Loss - Lightning | Lightning. | 1. Outputs onto Custom Property Template, form SS XX XX, Section A.3 or Section B. EXCLUSIONS. 2. Requires the use of a Property Insuring Agreement | Limit/100 of selected coverage component | Follows rating of selected coverage component (Bldg, BPP, BI) | Identify appropriate rating formula from Property Type coverage component rule set and insert Lightning rate from table into Base Rate promulgation. | Coverage component limit | By occupancy, territory table select appropriate rate: Bldg: X.XX BPP: X.XX BI: X.XX |
| Cause of Loss - Explosion | Explosion, including the explosion of gases or fuel within the furnace of any fired vessel or within the flues or passages through which the gases of combustion pass. This cause of loss does not include physical loss or physical damage by : (1) Rupture, bursting or operation of pressure relief (2) Rupture or bursting due to expansion or swelling of the contents of any building or | 1. Outputs onto Custom Property Template, form SS XX XX, Section A.3 or Section B. EXCLUSIONS; may not be output in both. 2. Requires the use of a Property Insuring Agreement | Limit/100 of selected coverage component | Follows rating of selected coverage component (Bldg, BPP, BI) | Identify appropriate rating formula from Property Type coverage component rule set and insert Lightning rate from table into Base Rate promulgation. | Coverage component limit | By occupancy, territory table select appropriate rate: Bldg: X.XX BPP: X.XX BI: X.XX |
| Cause of Loss - Windstorm or Hail | Windstorm or Hail, but not including: (1) Frost or cold weather; (2) Ice (other than hail), snow or sleet whether driven by wind or (3) Physical loss of or physical damage to awnings or canopies of fabric or slat construction, including their supports, (4) Physical loss or physical damage to the interior of any building or structure, or the proeprt inside the buiding or structure, caused by rain, snow, sand or dust, whether driven by wind or not, unldess the building or structure first | 1. Outputs onto Custom Property Template, form SS XX XX, Section A.3 or Section B. EXCLUSIONS, may not be output in both. 2. Requires the use of a Property Insuring Agreement | Limit/100 of selected coverage component | Follows rating of selected coverage component (Bldg, BPP, BI) | Identify appropriate rating formula from Property Type coverage component rule set and insert Lightning rate from table into Base Rate promulgation. | Coverage component limit | By occupancy, territory table select appropriate rate: Bldg: X.XX BPP: X.XX BI: X.XX |

FIG. 21B

| 2105 | 2120 | 2125 | 2130 | 2135 | 2140 | 2145 | 2150 |
|---|---|---|---|---|---|---|---|
| Building Coverage | Buildings, including: | 1. Outputs onto Custom Property Template, form SS XX XX, Section A. 1. Covered Property or A.2. Property Not Covered; may not be output into both. | Limit/100 | [(Rate+Rate+Rate) x (Cause of Loss Bundling Factor)] x Occupancy x CC x PC x BCEG x AS x Tier Factor x Schedule Rating Factor x Limit/100 | Select appropriate rate for each selected peril for Building coverage from each peril table; add peril rates together and apply Cause of Loss Bundling Factor to sum to derive Base Rate. Multiply Base Rate by occupancy, construction class. | $1,000 to $10,000,000 in $100 increments | Base Rate X.XX Occupancy, CC, PC, BCEG, AS factors contained in tables |
| Completed Additions | (1) Completed additions | 1. Outputs onto Custom Property Template, form SS XX XX, Section A. 1. Covered Property or A.2. Property Not Covered; may not be output into both. | Limit/100 or included within BPP limit | [(Rate+Rate+Rate) x (Cause of Loss Bundling Factor)] x Occupancy x CC x PC x BCEG x AS x Tier Factor | Add Rate for Completed Additions to Coverage component rating algorithm. | Coverage Component Limit | Base Rate X.XX Occupancy, CC, PC, BCEG, AS factors contained in tables |
| Fixtures & Equipment | (2) Permanently installed: (a) Fixtures; (b) Machinery; and (c) Equipment; | 1. Outputs onto Custom Property Template, form SS XX XX, Section A. 1. Covered Property or A.2. Property Not Covered; may not be output into both. | | [(Rate+Rate+Rate) x (Cause of Loss Bundling Factor)] x Occupancy x CC x PC x BCEG x AS x Tier Factor x Schedule | Add Rate for Completed Additions to Coverage component rating algorithm. | Coverage Component Limit | X.XX |
| Building Glass | (3) Building Glass, meaning glass that is part of a building or structure | 1. Outputs onto Custom Property Template, form SS XX XX, Section A. 1. Covered Property or A.2. Property Not Covered; may not be output into both. | | [(Rate+Rate+Rate) x (Cause of Loss Bundling Factor)] x Occupancy x CC x PC x BCEG x AS x Tier Factor x Schedule | Add Rate for Completed Additions to Coverage component rating algorithm. | Coverage Component Limit | X.XX |
| Additions & Renovations Under Construction | (4) if not covered by other insurance: (a) Additions under constructions, alterations and repairs to buildings and structures; (b) Materials, equipment, supplies and temporary structures on or within 1,000 feet of the "scheduled premises", used for making additions, alterations or repairs to the buildings or structures. | 1. Outputs onto Custom Property Template, form SS XX XX, Section A. 1. Covered Property or A.2. Property Not Covered; may not be output into both. 2. Requires output of "scheduled premises" definition component | | [(Rate+Rate+Rate) x (Cause of Loss Bundling Factor)] x Occupancy x CC x PC x BCEG x AS x Tier Factor x Schedule Rating Factor x Limit/100 | Add Rate for Completed Additions to Coverage component rating algorithm. | Coverage Component Limit | X.XX |

FIG. 21C

| 2105 | 2120 | 2125 | 2130 | 2135 | 2140 | 2145 | 2150 |
|---|---|---|---|---|---|---|---|
| Extra Expense | (1) We will pay reasonable and necessary Extra Expense you incur during the "period of restoration" that you would not have incurred if there had been no direct physical loss or physical damage to covered property caused by or resulting from a Covered Cau (2) Extra Expense means (a)To avoid or minimize the suspension of business and to (i) At the "scheduled (ii) At replacement premises or at temporary locations, (aa) Relocation expenses; and (bb) Cost to equip and operate the replacement or temporary location, other than those costs necessary to repair or to (b) To minimize the suspension of business if you cannot (c) (i) To repair or replace any (ii) To research, replace or restore the lost information on damaged "valuable papers and to the extent it reduces the amount of loss that otherwise would have been payable under this coverage or under | 1. Outputs onto Custom Property Template, form SS XX XX, Section A. 5. a. Additional Coverages. 2. Requires output of the following definition components in the Definitions section: "operations", "period of | Annual Operating Expenses | Rate x Annual Operating Expenses x Period of Recovery Factor | Select appropriate rate for EE from table based upon occupancy and age of business; select Period of Recovery Factor from table based upon occupancy (based on ratio of expected recovery period to annual operating period); multiply and apply to Annual Oper | Actual Loss Sustained or up to $5M in $100k increments | Rate: XXX Recovery Period Factor: XXX |

Continues with components such as Causes of Loss: Ordinance or Law, Equipment Breakdown, Flood, Power Failure; Additional Coverages such as Fire Dept. Surcharge, Pollutants & Contaminants Clean Up and Removal, Business Income from Dependent Properties. C

FIG. 21D

| Compositional Model Example of Elements Included | | | |
|---|---|---|---|
| Model Objective: | | To adjust the total additive promulgated premium derived for the Custom Property offering based upon the composition of coverages and customer characteristics generating a more accurate final premium. | |
| | | 2215 | 2220 |
| Element | | Exposure Related | Expense Related |
| Composition of Coverages | | | |
| Relationship of Information Based Coverages | 2205 | | |
| Accounts Receivable | | ✓ | ✓ |
| Valuable Papers and Records | | | |
| Valuable Papers and Records - Prototype Designs | | | |
| Computers and Media | | | |
| Relationship of Business Income Coverages | | ✓ | |
| Business Income & Dependent Property | | | |
| Relationship of Property Coverages to Business Income | | ✓ | ✓ |
| STC - Tools & Equipment and Business Income | | | |
| Building & BPP and Business Income | | | |
| Bldg & BPP & BI + Information Based Cvgs | | ✓ | ✓ |
| Number of Coverages | | | ✓ |
| | | | |
| Customer Characteristics 2210 | | | |
| LOBs in Account | | | ✓ |
| Computerized Sales & Inventory System | | | ✓ |

FIG. 22

SYSTEM AND METHOD FOR ADMINISTERING AN ADVANCED INSURANCE COMPONENT-BASED PRODUCT

RELATED APPLICATIONS

The present application claims the benefit of U.S. Provisional Patent Application No. 61/289,093 entitled "SYSTEM AND METHOD FOR ADMINISTERING ADVANCED COMPONENT-BASED PRODUCT PLATFORM" and filed Dec. 22, 2009. The entire content of that application is incorporated herein by reference.

FIELD

Embodiments relate to systems and methods to facilitate a component based insurance coverage product and creation of the component based insurance coverage product, a rating and pricing mechanism for the product, and may provide a selection mechanism for assembling components of the insurance coverage product.

BACKGROUND

Insurance companies provide a financial risk transfer mechanism through a contract of insurance. The contract may provide a promise to financially indemnify the insured, up to designated amounts, for covered losses arising out of the agreed upon transferred risks or exposures, subject to the terms and conditions of the contract. To implement their business, insurance companies develop insurance products and coverages that form the basis of the contract between the insurance carrier and the insured. An insurance policy is an individual instantiation of the contract specific to a designated insured, coverage period, and risk transfer comprised of, for example, selected products and coverages and a declarations page identifying individual elements of the insurance policy.

Insurers may face a number of challenges in managing their insurance product development including flexibility, speed to market, and expenses. Flexibility can be a challenge since insurers may want to meet the requirements of a great number and variety of insured, each with different and varied needs. Also, new risk exposures may develop that current insurance products do not address and insurers may desire to respond quickly to their customers' needs for coverage for new exposures, as well as to safeguard their financial exposure. While flexibility may be desired, insurers may want to balance the degree of customization provided to any individual insured with the expense associated with product variability. Accordingly, successfully balancing across these three elements can be a key product development challenge for insurance carriers.

As a highly regulated industry, insurance products must typically be filed and approved by a governing regulatory entity such as, for example, a department of insurance in each state. The filings may include the insurance contract itself and the elements that promulgate the premium charged for any individual instantiation or policy. In order to meet the statutory requirements, the insurance product is traditionally designed as a series of static forms, rates, and rules.

FIG. 1 depicts a system and methodology 100 wherein coverages, based on static forms, are created and filed anew with the appropriate regulatory entity when an existing coverage is extended or otherwise modified from its original static form. As illustrated, when a coverage such as Coverage 1 105 is changed, new versions 110 and 115 must be created and filed. Likewise, when a bundled enhancement coverage such as Stretch 1 120 is subsequently changed, new versions 125 and 130 must be created and also filed. Thus, it is seen that the time, effort, expense, and complexity of system 100 may quickly become untenable, particularly since system 100 relies heavily on human intervention.

One approach to reduce the amount of human intervention required would be to create a framework rating plan with general terms and conditions applicable to all coverages and then file the rating plan with a number of coverages to obtain rating approval. Unfortunately, such an approach still fails to reduce the complexity and amount of human intervention required to construct and file versions. Further, the individual coverages of such an approach are not able to be combined in ways to create new or customized products based on individual needs.

Systems and methods are desired to facilitate insurance products based on components and the creation of such products. It is desirable for the insurance products to be based on reusable components that can be used to dynamically create insurance coverages. Also desired are the compositional rating and pricing and the automatic use of the of the component based insurance product.

SUMMARY

Some embodiments provide insurance products based on components and the efficient creation of those insurance products. In some embodiments, a componentized form structure comprising pre-filed and pre-approved coverage components, each with its own rating algorithm and availability rules, is provided. Related to the coverage components, an output structure may also be filed. The coverage components and their rating algorithms may be programmed in a rating engine, a policy administration system and/or other appropriate system for output utilizing a publishing application, and the form output structure to create the final form composed of the components selected and included in an insurance product. The rating engine may be programmed with rates and algorithm rules for each component that is accessed upon selection. As the component parts and the form output structure are pre-filed with rules regarding the selection and combinable assembly of the component parts into the final output, the coverage form may be tailored to the individual insured, a particular customer segment, distribution channel or other identified distinguishing grouping without the time and expense associated with a new countrywide filing or programming of a new product form.

In some embodiments, a rating and pricing model that incorporates the impact of multiple coverages upon each other, the impact of bundling of coverages on expense, the composition of the bundled coverages with the customer characteristics of the individual insured to produce a final premium based upon the combined rating of the component parts as influenced by the context in which they are being combined is provided.

In some other embodiments, a selection mechanism is provided to facilitate selection of a combination of components to comprise an insurance coverage. In some embodiments, the selection mechanism may interact with a human interface, while some other embodiments may be linked to a recommendation engine that, based upon specific models, identifies or recommends the appropriate combination or assembly of coverages for an individual insured.

Some embodiments comprise: means for describing one or more self-descriptive components of an insurance coverage, the one or more components having one or more associated properties defining attributes of the component and one or more values associated with the properties; means for selecting a plurality of the one or more components to include in an insurance coverage product; means for combining the plurality of the one or more components within constraints of the properties and values of the individual components; and means for presenting an insurance coverage policy based on the combination of the plurality of the one or more components.

A technical effect of some embodiments of the invention is an improved and automated insurance product creation system for insurance companies, partners, and/or consumers. Those skilled in the art will appreciate that features of embodiments may be used in conjunction with other financial products with similar desirable results. With this and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 is a tabular view of a portion of a component database in accordance with some embodiments of the present invention;

FIGS. 19A-19C is an annotated custom property form for an insurance coverage based on components, according to some embodiments;

FIGS. 20A-20C is another annotated custom property form for an insurance coverage based on components, according to some embodiments;

FIGS. 21A-21D is a tabular representation of components and associated data, according to some embodiments; and FIG. 22 is a tabular representation related to a compositional model rating, according to some embodiments.

DETAILED DESCRIPTION

Figure 1:
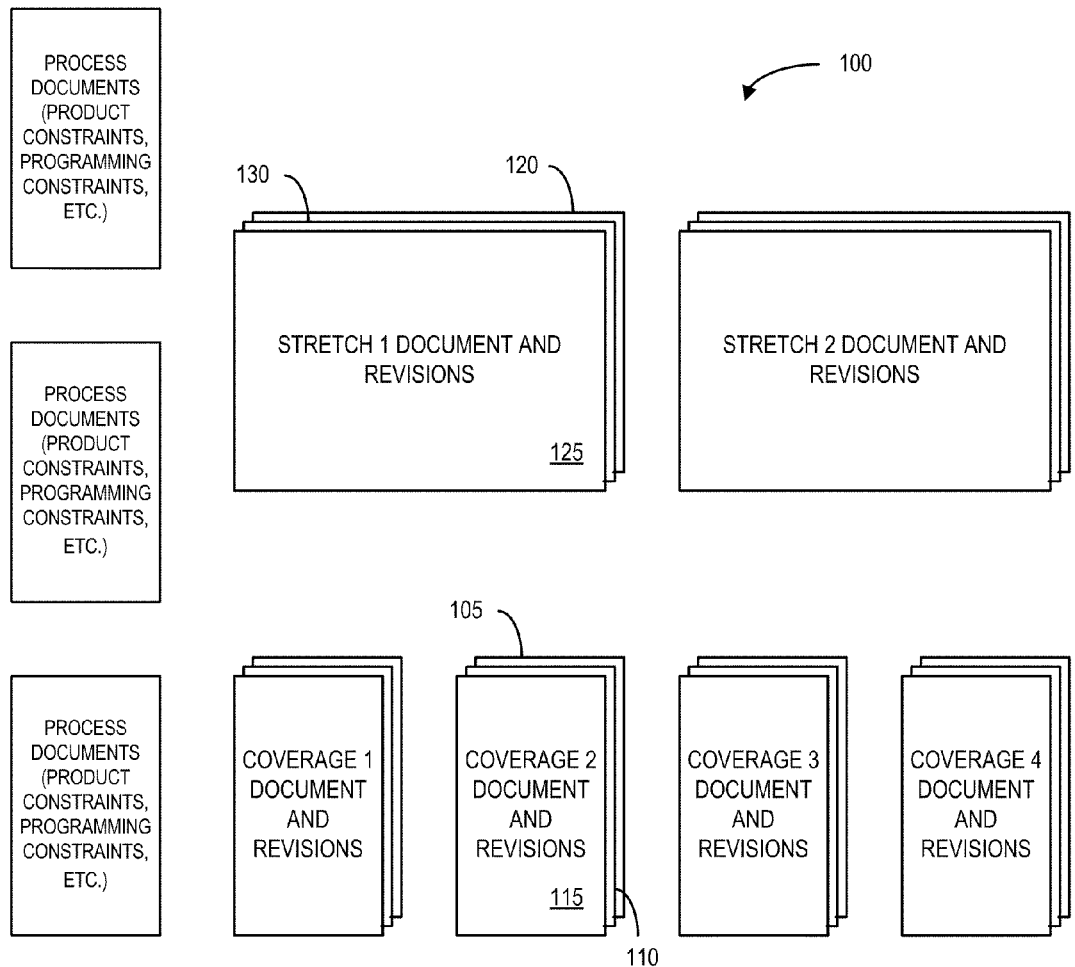
FIG. 1 Is a depiction of prior art static coverage forms.

As an introduction to the embodiments of the present disclosure, a number of concepts and terms related to insurance will be discussed. As used herein, a form contains the contract language of an insurance policy. The language addresses all aspects of the contract including coverage grants, exclusions, definitions of terms used in the contract, terms and conditions of the contract, applicability of insurance and amounts of coverage. An insurance product may include many different forms. Some of the main types of forms include a Base Coverage form that establishes a foundation for any policy and is required for any policy utilizing that product; an Endorsement form that amends the base form to expand, contract or define coverage further, and Policy forms that instantiate the contract for the specific risk transfer and insured.

Base coverage forms have a premium associated with them, endorsement forms may or may not have a premium impact, whereas policy forms typically do not have a premium associated with them. Each form that has a premium, has an associated rating methodology and if appropriate, a rating formula and rate. Rating formulas include base rates and may include rating factors to adjust the rate based upon certain characteristics of a particular instantiation.

Each form may also have rules that define how and/or when the form may be used. Each rating methodology may include the rules determining how that coverage is rated and what factors, if any, apply. In order to obtain approval from the regulatory bodies, forms, rates and rules must generally be filed with a controlling regulatory entity. For example, each state has a department of insurance that is responsible for the oversight of the insurance industry in its state and has responsibility to review and approve, disapprove, or require the revision of any filed form, rule or rate. As such, each insurance form is, historically, filed as a static form with an explicit rating methodology, including factors, and rates that are based upon the insurers experience and forecasted experience. Once filed and approved, the forms, rules and rates related to an insurance product may not be changed without re-filing and gaining approval anew.

Historically, flexibility is gained in insurance products through the use of numerous endorsements. Products offering a limited amount of provided coverage by base forms that may be modified significantly and in greatly varied manners by the utilization of endorsements may provide some degree of flexibility. However, such products possess a high level of complexity, require a level of expertise to determine what forms (e.g., coverages) and what limits (e.g., amounts of insurance) should be combined to create a policy that meets the needs of the insured. In many instances, an agent or other person is needed to act as an expert advisor. The development and maintenance of the complex products also drives a certain level of cost as each form, each rule, each rating methodology and rate needs to be filed and programmed. For national insurance carriers, filings are done countrywide and filing fees may be based upon the number of forms filed. Also, programming often impacts multiple systems and additional manual intervention is required to select the appropriate coverages to issue a quote or forms in order to issue a policy. The introduction of any new coverage requires form development, filing and programming. Accordingly, while some degree of flexibility may be provided, the expense of providing the flexibility may be high but the speed to market is unchanged.

In an effort to reduce the expense of handling and the amount of expertise required to assemble the appropriate coverages for an individual insured, simpler products that bundle coverages together have been developed. When originally introduced the bundled products had a limited number of endorsements that could be used to modify the base form. These products were simpler to manage than individualized insurance products but less flexible in customizing to an individual insured. However, over time insurance carriers have added numerous optional endorsements to their bundled, thereby creating a products with a higher degree of flexibility but also increasing cost and complexity.

Bundling of optional coverages together in specific tailored endorsements is a mechanism used to balance flexibility and expense. Each endorsement contains a number of optional coverages at pre-set limits which product development has determined to be relevant and valuable to the target customer segment, often industry based. The cost of these tailored endorsements is less than purchasing the optional coverages separately reflecting the savings of bundling. However, as each endorsement must be filed and approved as a static form, and is programmed in the same manner as any other form, the degree of flexibility and speed of response to the market is limited.

In the past an instance of creating insurance coverages, filing them, and combining coverages to create policies, involved the process of describing insurance coverages, including their components such as clauses that apply, rates, rules that constrain the coverages, etc., using text based document that could be understood by a person. Persons, such as a product manager, further used textual documents to specify when to generate forms corresponding to the coverage by automated systems. The product managers would also use text based documents to specify rating rules and rating factors Programmers would use these static text based documents and other inputs to automate the generation of policy documents issued to customers. These static text documents inputs were also used by filing systems that file such coverages for approval by state examiners.

In order to extend coverage using the static form based system, a product manager or other persons may have chosen two different approaches. In a first approach, existing coverage clauses, rates, or rules are modified and a new document is created. The new document, combined with product manager instructions, would be used to create filings for each of the state regulators. Once approved by the state regulators, a new and final version of the document is created and used by developers to program systems that generate policy, underwriting rules, etc. In a second approach, instead of modifying individual coverages, the product manager may generate a bundled coverage that extends all of the coverages for a certain market segment. Conceptually, such coverages sit on top of a group of coverages and modify them all. These coverages (e.g., bundled enhancement endorsements) are filed as though they are new coverages and the same process as used in the first approach is used to operationally implement these new stretches.

It is noted that in both of the approaches, the extended individual coverage and bundled enhancements, are composed anew each time. Furthermore, it is noted that the product managers do not use machine understandable formats, but instead use human understandable textual language descriptions that are then translated by humans. While this approach may be sufficient when the number of coverages is small or when the interaction between the coverages and coverages and bundled enhancement endorsements is minimal, as the number of coverages expand and bundled enhancements are constantly modified to keep pace with competition, the number of forms that are filed and the programming that is done in operational systems rapidly increases. Furthermore, duplication of extensions and coverages is common, with no way of checking semantic inconsistencies.

In some embodiments herein, insurance coverages, including bundled enhancements, and process constraints are based on components of reusable coverage elements. In some embodiments, the coverage components may be described in a machine understandable structure and format. The machine understandable structure and format of the components facilitates automatic machine, computer, application, and service interaction (e.g., intake, output, processing, etc.) with the components without a need for a person to interpret and/or manipulate the components. In some instances, the components may facilitate a program, process, or application checking for duplication services/functions and consistencies since the insurance coverages are composed from machine understandable components. In some aspects, programs, applications, and services can consume the descriptions of the components automatically.

Figure 2:
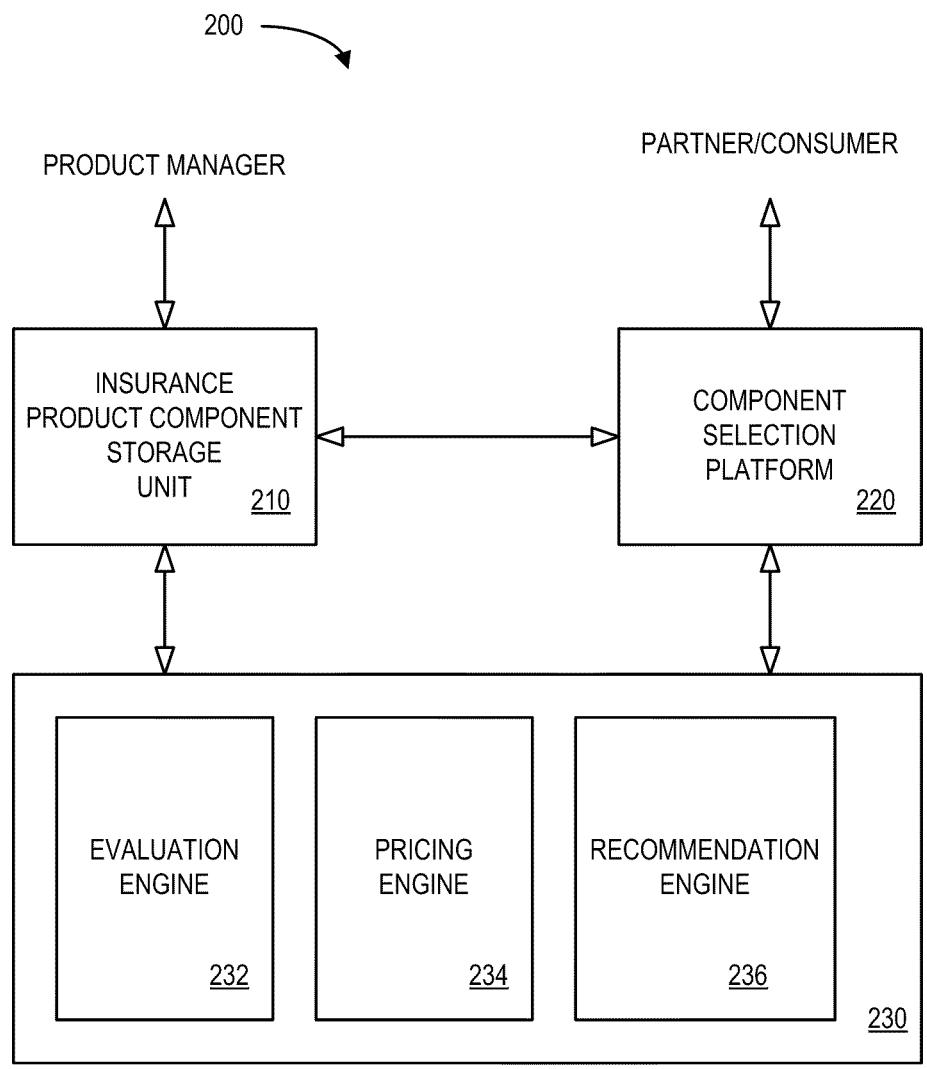
FIG. 2 is block diagram of a system to facilitate creation of an insurance coverage product in accordance with some embodiments.

For example, FIG. 2 is block diagram of a system 200 to facilitate creation of an insurance coverage product in accordance with some embodiments. In particular, an insurance component storage unit 210 may store information about various insurance policy components. For example, a product manager might manually define component terms and rules to be stored in the insurance product component storage unit 210. The storage unit 210 might be associated with, for example, one or more servers or databases.

A component selection platform 220 might let a user (e.g., an insurance partner or an insurance customer) select various components from the storage unit 210. For example, an insurance agent might manually select components via the component selection platform 220 using a Graphical User Interface (GUI). The component selection platform 220 might be associated with, for example, a Personal Computer (PC), a workstation, a notebook computer, and/or a handheld device. The selected components might then be combined to create an insurance policy.

Any of the devices described in connection with the system 200 may access information in one or more databases. The databases may include, for example, information about customers, insurance policies, and/or insurance policy components. Moreover, any of the devices may exchange information via a communication network. These devices (and any of the other devices described herein) could be associated with, for example, a server, a PC, a mobile or laptop computer, or any other appropriate storage and/or communication device adapted to exchange information via a web site and/or a communication network. As used herein, devices (including those associated with the component selection platform 220 and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single insurance product component storage unit 210 and component selection platform 220 are shown in FIG. 2, any number of such devices may be included. Moreover, various devices described herein might be combined or co-located according to embodiments of the present invention.

The component selection platform 220 might include, for example, a communication device to receive information from a plurality of remote input devices. The input devices might be associated with, for example, a person or entity selling insurance or an insurance client. The component selection platform 220 might further include a processor coupled to the communication device and a storage device in communication with the processor and storing instructions adapted to be executed by said processor to facilitate the creation of insurance coverage policies in accordance with any of the embodiments described herein.

The system 200 may further include additional elements 230 coupled to the insurance product component storage unit 210 and/or the component selection platform 220. For example, an evaluation engine 232 might determine whether or not various selectable components are compatible with each other. In some cases, the evaluation engine 232 might review selected components to determined whether or not that particular set of components is valid (e.g., after a user submits a proposed set of components). In other cases, the evaluation engine 232 might prevent invalid components from being displayed to a user in substantially real time (e.g., selection of one component by a user might automatically cause another component to be removed from a list of available components that is being displayed to the user). Moreover, a pricing engine 234 might automatically evaluate risk and price information associated with the selected components. According to some embodiments, a recommendation engine 236 may review the components being selected by a user and, based on the selections and/or other information about the user, automatically suggest one or more recommended components that might be of interest to the user.

Figure 3:
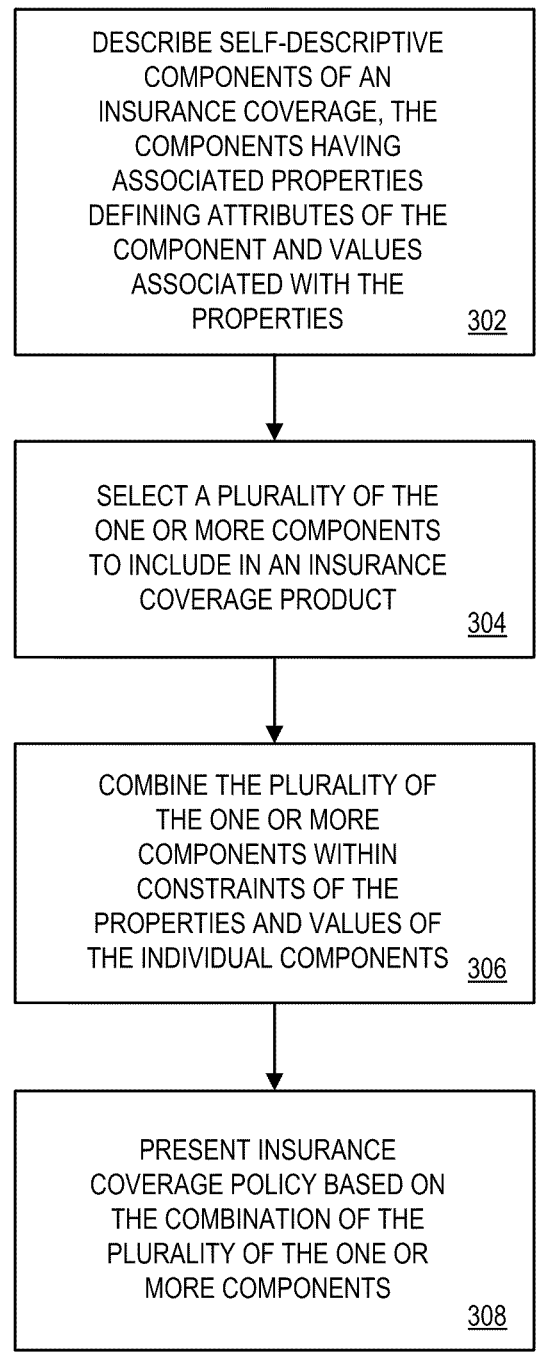
FIG. 3 illustrates a method according to some embodiments of the present invention.

FIG. 3 illustrates a method that might be performed, for example, by some or all of the elements of the system 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, one or more self-descriptive components of an insurance coverage may be described. For example, a product manager might enter information to describe each component. The one or more components may have, according to some embodiments, one or more associated properties defining attributes of the component and one or more values associated with the properties. Note that some or all of the components may be pre-filed with and/or approved by a regulatory entity having regulatory jurisdiction regarding the insurance coverage policy. Moreover, according to some embodiments at least one of the properties associated with each of the components defines an individual rating and/or pricing algorithm for establishing the premium charge of an insurance product including each component, alone and in combination with other components.

Note that the insurance coverage policy might be associated with, for example, insurance coverage types such as middle market insurance, specialty insurance, personal lines insurance, group benefits, or life insurance. The insurance coverage policy may further be associated with specific products, such as fire insurance, property insurance, construction insurance, business insurance, flood insurance, health insurance, automobile insurance, liability insurance, workers compensation insurance and/or life insurance. Further note that that an assembled insurance policy could include components associated with different types of insurance (e.g., fire and business insurance components could be combined). Moreover, each of the components could be associated with, for example, a component name, language text, a product rule, a rating base, a rating algorithm, a pricing algorithm, an underwriting constraint, a rating rule, a limit option, and/or a rate factor value.

At 304, a plurality of the one or more components may be selected to be included in an insurance coverage product. For example, an insurance agent or customer might select the components via a GUI. Note that the system might automatically validate the set of selected components (e.g., after the set is submitted by a user or on-the-fly as the user is making his or her selections). The validation might be performed, for example, based on a minimum value associated with a component, a maximum value, a geographic location, a presence of another selected component, underwriting criteria and/or an absence of another selected component. According to some embodiments, an automatic presentation of a recommended component is made to the user, and the recommended component might be determined at least in part based on the set of selected components.

At 306, the plurality of the one or more components are combined within constraints of the properties and values of the individual components. At 308, the system may then present an insurance coverage policy based on the combination of the plurality of the one or more components. For example, the presentation of the insurance coverage policy might be associated with a transmission of data to or storage of data in a remote device via a communication network.

Figure 4:
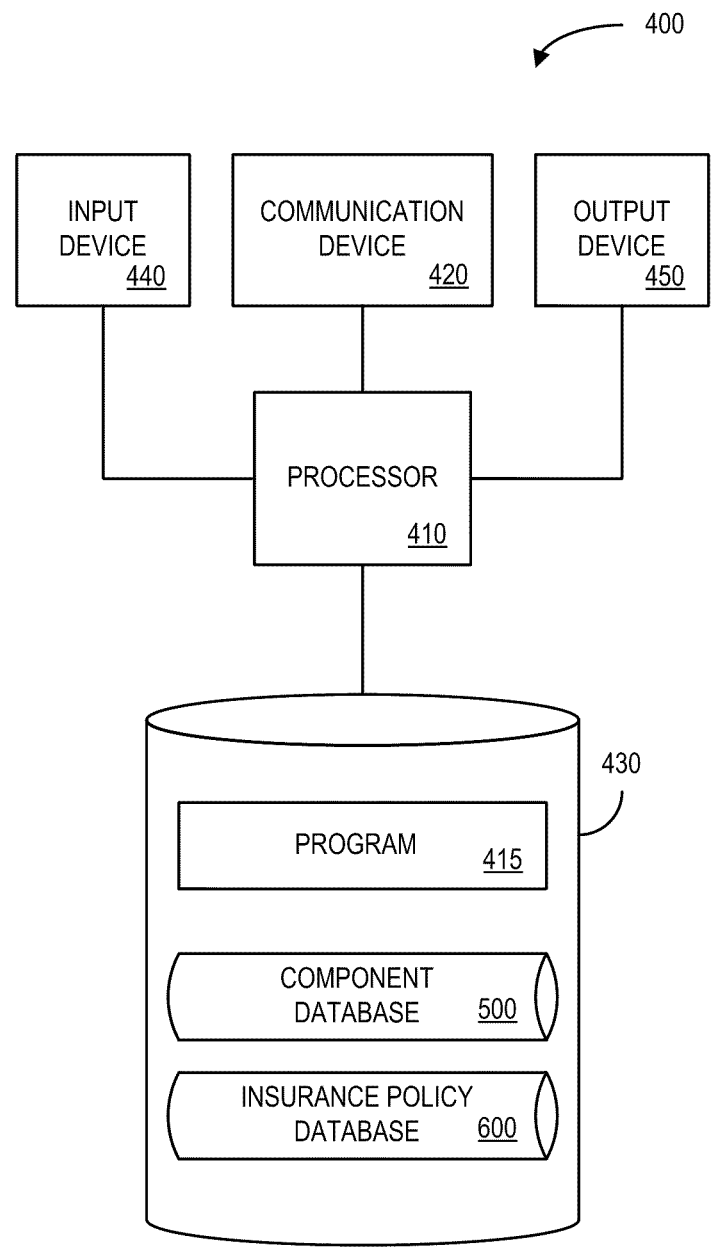
FIG. 4 is a block diagram of an insurance apparatus in accordance with some embodiments of the present invention.

FIG. 4 is a block diagram of an insurance apparatus 400 in accordance with some embodiments of the present invention. The apparatus 400 might, for example, comprise a platform or engine similar to the component selection platform 220 illustrated in FIG. 2. The apparatus 400 comprises a processor 410, such as one or more INTEL® Pentium® processors, coupled to a communication device 420 configured to communicate via a communication network (not shown in FIG. 4). The communication device 420 may be used to exchange component and/or insurance policy information, for example, with one or more remote devices.

The processor 410 is also in communication with an input device 440. The input device 440 may comprise, for example, a keyboard, a mouse, or computer media reader. Such an input device 440 may be used, for example, to enter information about components and/or component selections. The processor 410 is also in communication with an output device 450. The output device 450 may comprise, for example, a display screen or printer. Such an output device 450 may be used, for example, to provide reports and/or display information associated with components and/or component selections. The processor 410 is also in communication with a storage device 430. The storage device 430 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices. The storage device 430 stores a program 415 for controlling the processor 410. The processor 410 performs instructions of the program 415, and thereby operates in accordance any embodiments of the present invention described herein. For example, the processor 410 may retrieve information about one or more self-descriptive components of an insurance coverage, the one or more components having one or more associated properties defining attributes of the component and one or more values associated with the properties. The processor 410 may then facilitate a selection of a plurality of the one or more components to include in an insurance coverage product. For example, a user might manually select components using the insurance apparatus 400. The processor 410 may further combine the plurality of the one or more components within constraints of the properties and values of the individual components and/or present an insurance coverage policy or data describing such an insurance coverage policy based on the combination of the plurality of the one or more components.

As used herein, information may be "received" by or "transmitted" to, for example: (i) the insurance apparatus 400 from other devices; or (ii) a software application or module within the insurance apparatus 400 from another software application, module, or any other source.

As shown in FIG. 4, the storage device 430 may also store a component database 500 and/or an insurance policy database 600. Examples of such databases 500, 600 that may be used in connection with the insurance apparatus 400 will now be described in detail with respect to FIGS. 5 and 6. The illustrations and accompanying descriptions of the databases presented herein are exemplary, and any number of other database arrangements could be employed besides those suggested by the figures. For example, different databases associated with different types of policies or components might be associated with the apparatus 400.

Figure 7:
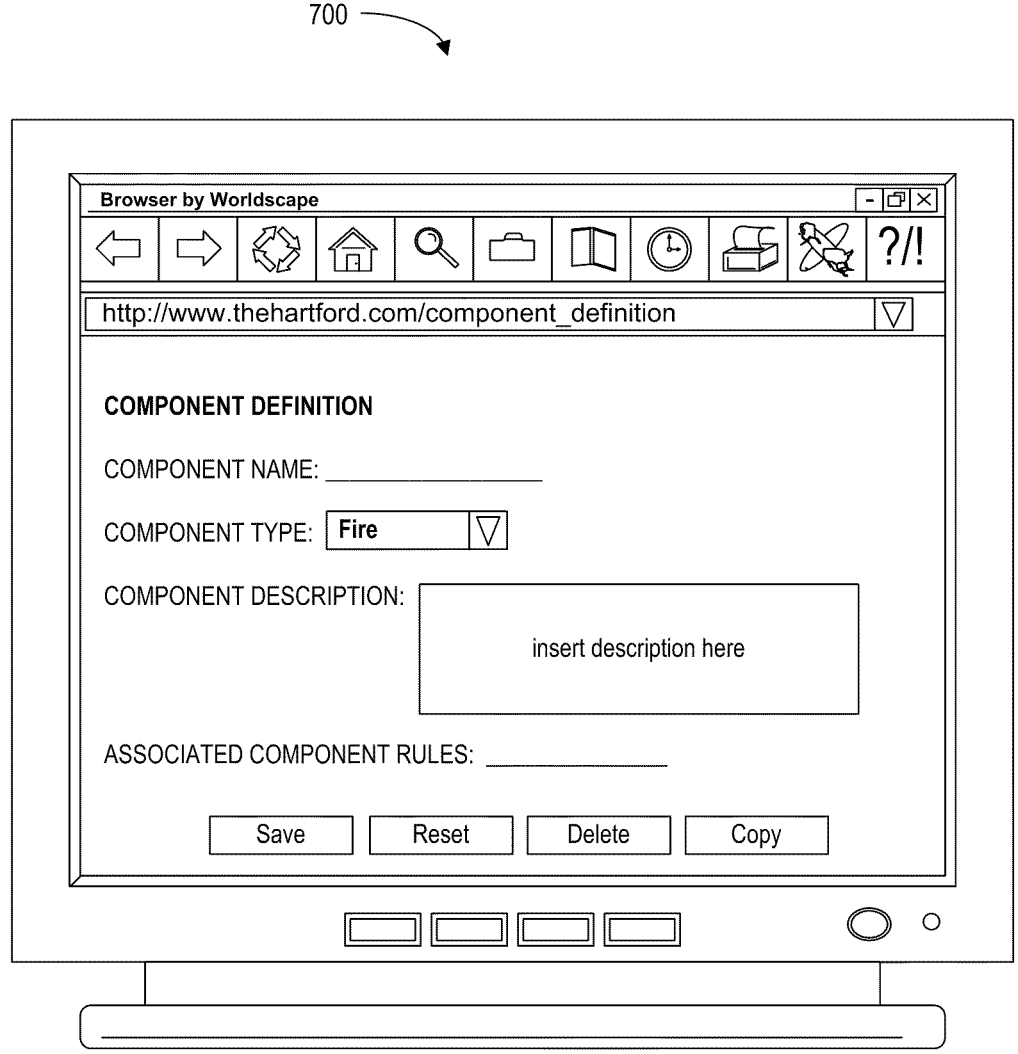
FIG. 7 is an example of a component definition display according to some embodiments.

FIG. 5 is a tabular view of a portion of a component database 500 in accordance with some embodiments of the present invention. The table includes entries associated with components that might be assembled by a user into an insurance coverage policy. The table also defines fields 502, 504, 506, 508, 510 for each of the entries. The fields specify: a component identifier 502, a description identifier 504, rules 506, pricing/risk information 508, and a status 510. The information in the database 500 may be periodically created and updated based on information received from a product manager. For example, FIG. 7 illustrates a component definition 700 display according to some embodiments. Such a display 700 might be used, for example, by a product manager to enter a component name, description, and/or component rules. By way of example, a component named "Cause of Loss—Explosion" might be associated with the following description: "EXPLOSION, including the explosion of gases or fuel within the furnace of any fired vessel or within the flues or passages through which the gases of combustion pass. This cause of loss does not include physical loss or physical damage by rupture, bursting or operation of pressure relief." Moreover, the associated rule might indicate that "outputs are to be provided onto a Custom Property Template, form ID 12345, Section A.3 or Section B (Exclusions); may not be output in both. Requires the use of a Property Insuring Agreement."

Referring again to FIG. 5, the component identifier 502 might be, for example, an alphanumeric code that uniquely identifies an insurance component that may be selected by a user. The description identifier 504 might describe the component or link or point to another file or database entry that contains a description of the component. The rules 506 might, for example, indicate when the component should be selectable and/or point to other files or database that contain the rules. The pricing/risk information 508 might include rules and/or values associated with an insurance premium to be assigned to the component. The status 510 might indicate, for example, that a particular component is currently available to customers (e.g., "active") or that the particular component has been removed from the marked (e.g., "expired").

Figure 6:
FIG. 6 is a tabular view of a portion of an insurance policy database in accordance with some embodiments of the present invention.
Figure 8:
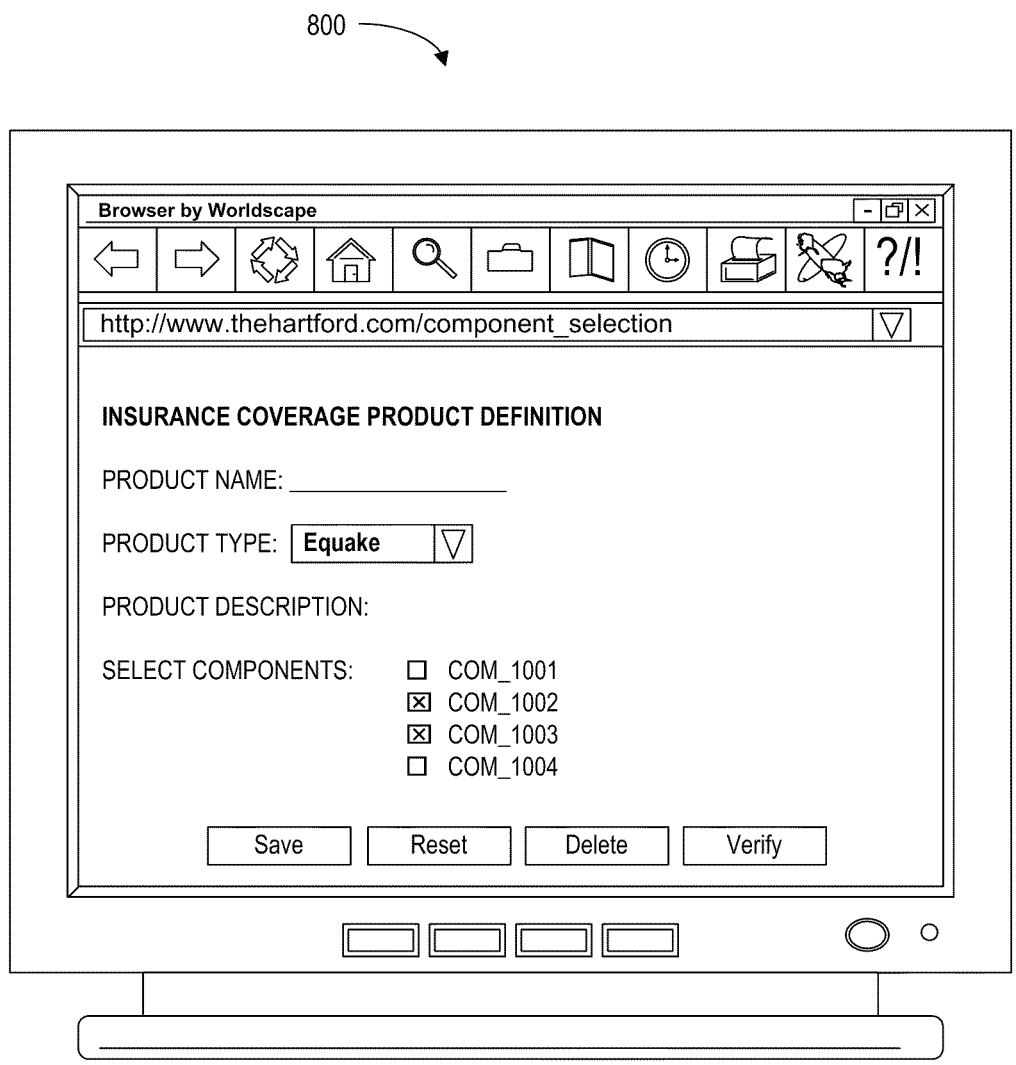
FIG. 8 is an example of a component selection display according to some embodiments.

FIG. 6 is a tabular view of a portion of an insurance policy database 600 in accordance with some embodiments of the present invention. The table includes entries associated with insurance policies that have been created (or are currently being assembled) using components. The table also defines fields 602, 604, 606, 608, 610 for each of the entries. The fields specify: a policy identifier 602, an assembler 604, components 606, a premium 608, and a status 610. The information in the database 600 may be periodically created and updated based on information received from an insurance partner or client. FIG. 8 is an example of a component selection display 800 that might be used to create an insurance coverage policy according to some embodiments. An insurance partner or customer could use such a display 800, for example, to manually select one or more components to be associated with the insurance coverage policy.

Referring again to FIG. 6, the policy identifier 602 might be, for example, an alphanumeric code that uniquely identifies an insurance policy that has been, or is being, assembled using components from the component database 500. The assembler 604 might be an alphanumeric code or identifier describing the user who created the policy (e.g., e.g., an insurance partner or consumer). The components 606 may include one or more component identifiers 502, associated with the component database 500, to be included in the insurance coverage policy. The premium 608 might represent an overall premium value that has been automatically calculated for the policy based at least in part of the components 606. The status 610 might indicate, for example, that a particular policy is currently being assembled (e.g., "pending" and not yet approved), has already been "issued," or has been flagged for manual review (e.g., "exception").

Figure 9:
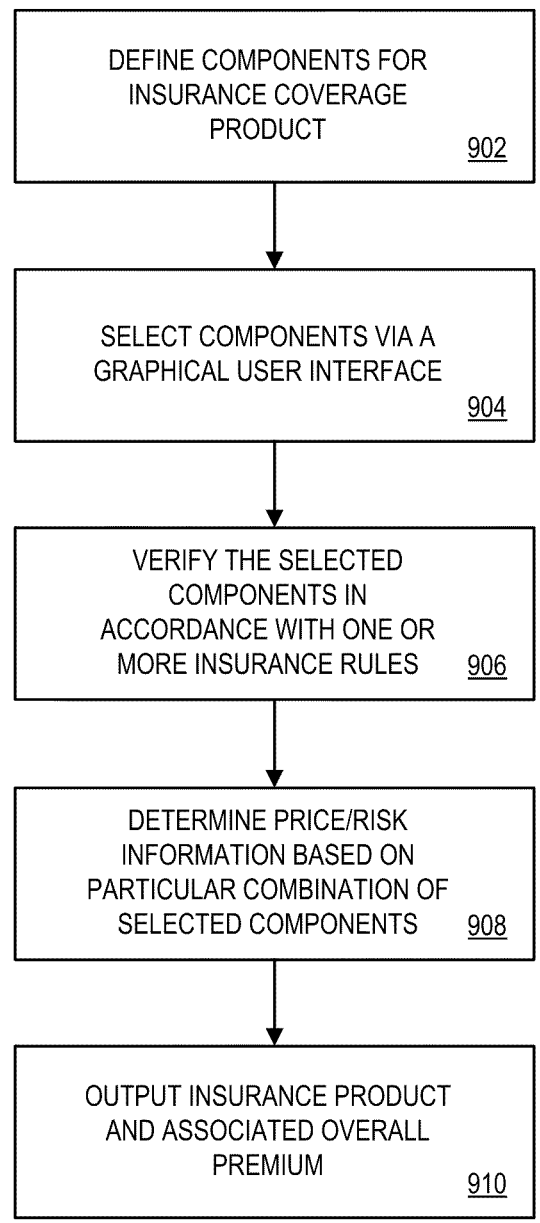
FIG. 9 illustrates a method according to some embodiments of the present invention.

The insurance apparatus 400, associated databases 500, 600, and/or GUIs 700, 800 may therefore facilitate the creation of insurance coverage policies by a user. For example, FIG. 9 illustrates a method according to some embodiments of the present invention. At 902, potential components that may be associated with insurance coverage policies may be defined (e.g., by a product manager). At 904, at least some of the potential components are selected by a user via a GUI (e.g., an insurance partner, agent, or customer might select various components as appropriate).

According to some embodiments, the selected set of components is verified at 906 in accordance with one or more insurance rules. For example, selection of a first component might automatically make a second component invalid. At 908, price/risk information is determined based on the particular combination of selected components. Note that the determination might comprise more than simply adding up premiums associated with each selected component. For example, selection of a first component might reduce the cost associated with a second component. At 910, an insurance produce and associated overall premium may be output (e.g., transmitted to a remote device and/or printed for signature by the parties).

Figure 10:
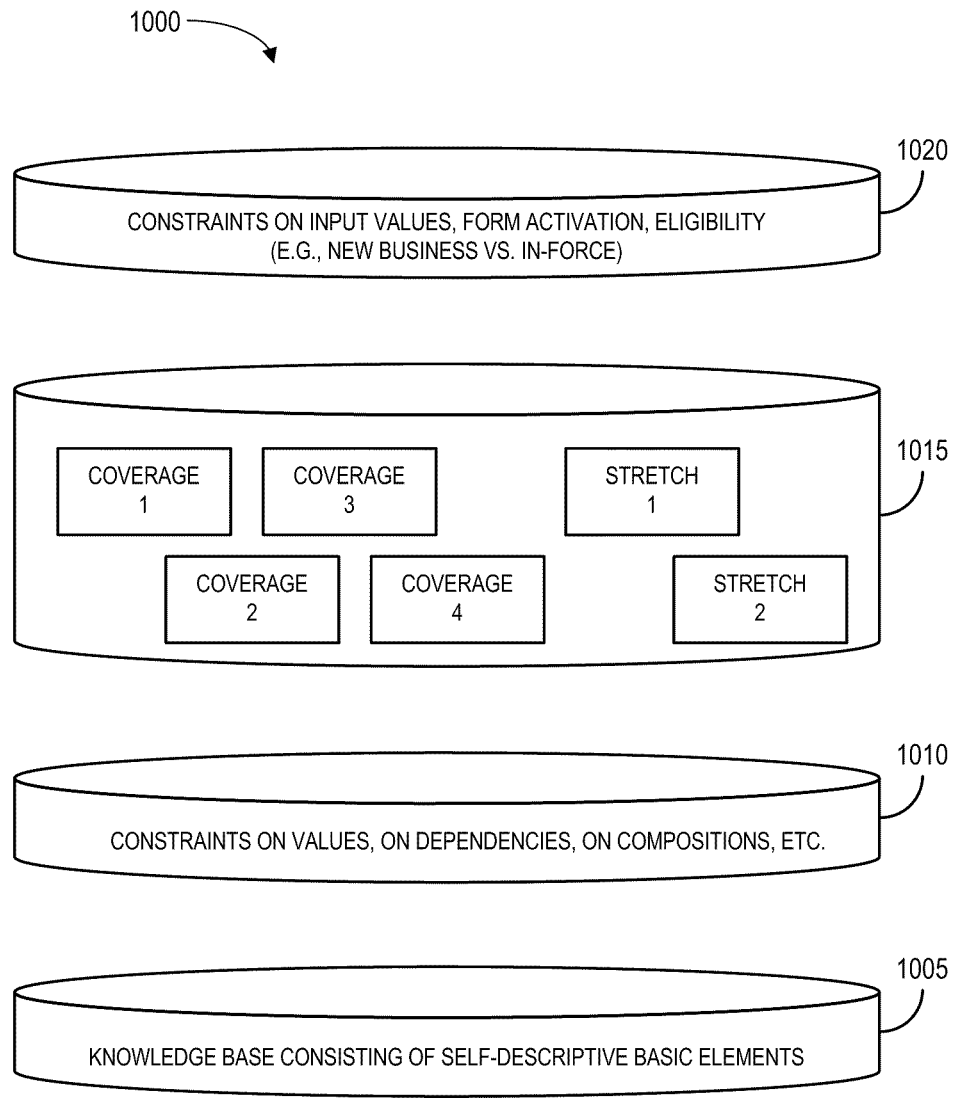
FIG. 10 is a representative illustration of some aspects herein.

FIG. 10 is a depiction of some embodiments according to some systems and methods herein. As shown, the descriptions 1005 that comprise a coverage are decomposed and abstracted into reusable components. The descriptions of the coverages and stretches at 1015, as defined by the constraints 1010 on the values, dependencies, permissible compositions, etc. might be semantically expressed to be understood by a machine, application, program, or service. Constraints 1020 of various types (e.g., on input values form activation, and eligibility) associated with the components forming the insurance coverages, may also be expressed such that external programs could automatically process not just the descriptions of the components but also about constraints on them.

One example of a component definition display 700 is provided in FIG. 7. Such a display might be used, for example, by a product manager to enter a component name, description, and/or component rules.

In some embodiments, insurance coverages may be assembled using a number of descriptive insurance components. The insurance coverages may be assembled by various entities. The entities may include, for example, a product developer or other carrier specialist that wishes to create an insurance coverage offering for a specified customer segment, channel or other targeted marketing grouping. In some instances, a recommendation engine may be used to assemble an insurance coverage offering for an individual customer utilizing the recommendation model to identify the appropriate composition of components and limits. In some other embodiments, an agent or eBusiness partner may assemble an insurance coverage offering for an individual client by selecting desired components based upon their expertise. Additionally, an insured customer or prospective insured may select desired components from a set of components based upon their needs and in conjunction with receipt of component and limit recommendations from a recommendation expert, engine or otherwise.

In some embodiments, an entity (e.g., the assembler) enters an appropriate selection interface. The selection interface may be associated with or part of an insurance product management or quoting platform, or an independent device, system, or method. The assembler may then manually select a specific component for inclusion in the insurance coverage. One example of a selection display 800 is provided in FIG. 8. The selected component may be brought into, tagged for, identified, or (pre)processed for an output template. At this point, the property values associated with the selected component may be reviewed and set in accordance with the desired insurance coverage offering, yet within the rules of the component (e.g., based on value constraint). Upon selection, embodiments may validate that the component is available for the desired output template. In some instances, a particular component may not be available for inclusion in a particular insured coverage.

After the selection of the first component, a second component having desired values and characteristics is selected. Component availability and combinability with the first selected component may be validated. The assembler may review and, in some instances, modify the properties of the components as desired and in accordance with the component rules and the combinability rules associated with the components.

Selection of additional components may continue until assembly of the desired coverage offering is complete. Validation rules may be executed, consulted, and considered during selection and composition process to identify conflicts (if any) and constraints. In some instances, if the component selections are made at a point of insurance quoting, underwriting rules may also be considered. In some aspects, coverage components may or may not be available for use in a particular combination and/or section of an insurance coverage product. Rules pertaining to whether a component may be used and/or combined with another component in some or all sections of an insurance coverage may be specified in Compositional Rules associated with a component.

A recommendation engine 236, such as the one illustrated in FIG. 2 may, according to some embodiments, suggest one or more components to a user. For example, the recommendation engine 236 might review the components currently selected by a user and automatically determine that an additional component might be helpful or appropriate based on user information and/or the currently selected insurance components.

Figure 11:
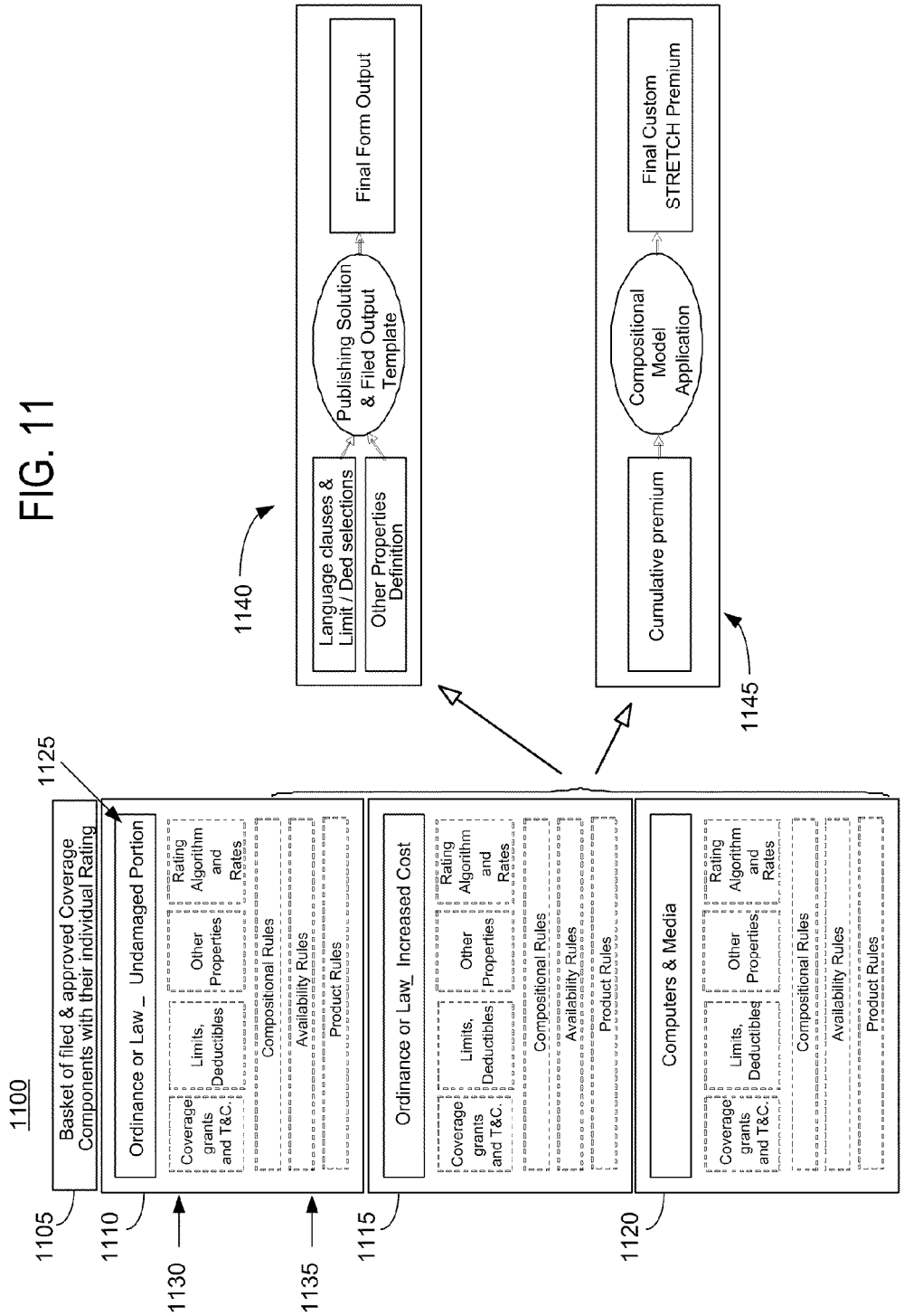
FIG. 11 is a graphical representation of an insurance product, in accordance with some embodiments herein.

FIG. 11 illustrates some aspects of an insurance coverage component assembly process.

System 1100 provides, at a high level, an example of exemplary coverage and the components, each with their own properties, rating, and rules that may be selected to create a bundled enhancement endorsement. As shown, a Product Definition System 1105 includes a set or basket of components previously filed and approved by a regulatory entity (where applicable) that form the depicted coverage. In the example of FIG. 11, three components are provided, although other quantities of components may be used in other embodiments. The three components include an Undamaged Portion component 1110, an Increased Cost component 1115, and a Computers & Media component 1120. Each of the components 1110-1120 include associated coverage grants and T & C (terms and conditions); limits, deductibles; other properties (e.g., 1130); and a rating algorithm and rates properties (e.g., 1125). Additionally, the components might include compositional rules that state how a component may be combined with other components, availability rules that determine if and when a component is available for selection and assembly with other components, and/or product rules relating to an insurance product being offered (e.g., 1135).

The individual coverage components 1110, 1115, and 1120 and their associated properties and rules, are defined and contained within the Product Definition System 1105 system outputs a product data model that is provided by other systems using and/or requiring the insurance coverage product information. Publishing system 1140 receives the product data model and processes it to provide a published final form. Rating system or engine 1145 based on coverage combinations and other information, such as the rating algorithms and rates of the components 1110-1120 and customer data, may determine a premium for the offered product.

By way of example, the system 1100 might be associated with a custom stretch endorsement having a definition, a customer benefit, a company benefit, and/or a construction. The definition might be associated with a stretch endorsement such as an option coverage form which an insured can elect to add to his or her existing policy. It may provide a bundle of coverages with specified limits in addition to the coverage provided in the base policy. This might reduce the need to purchase the coverages individually (e.g., and potentially reduce a cost associated with the coverages). The customer benefit might be associated with a componentized construct that enables the insured to select the coverages and limits which he or she would like to include in the stretch endorsement and he or she may receive a premium reflective of the combination of coverages, limits purchases, and individual exposure level and relevant customer characteristics. The company benefit might be associated with coverages tailored to specific customer segments or program groups and may be tailored at the point of sale by an individual agent or risk. Premiums may be reflective of the combination of coverages and limits purchased and the unique exposure and expense profile of the customer segment, group, or the individual insured. The construction might be associated with individual coverage components that are selected and a base rating may be completed per the individual component rating methodology and rates. When all selection and base ratings are complete, the compositional model may be applied to adjust the premium based upon the specific combination of coverages and limits selected and/or the customer characteristics.

Figure 12:
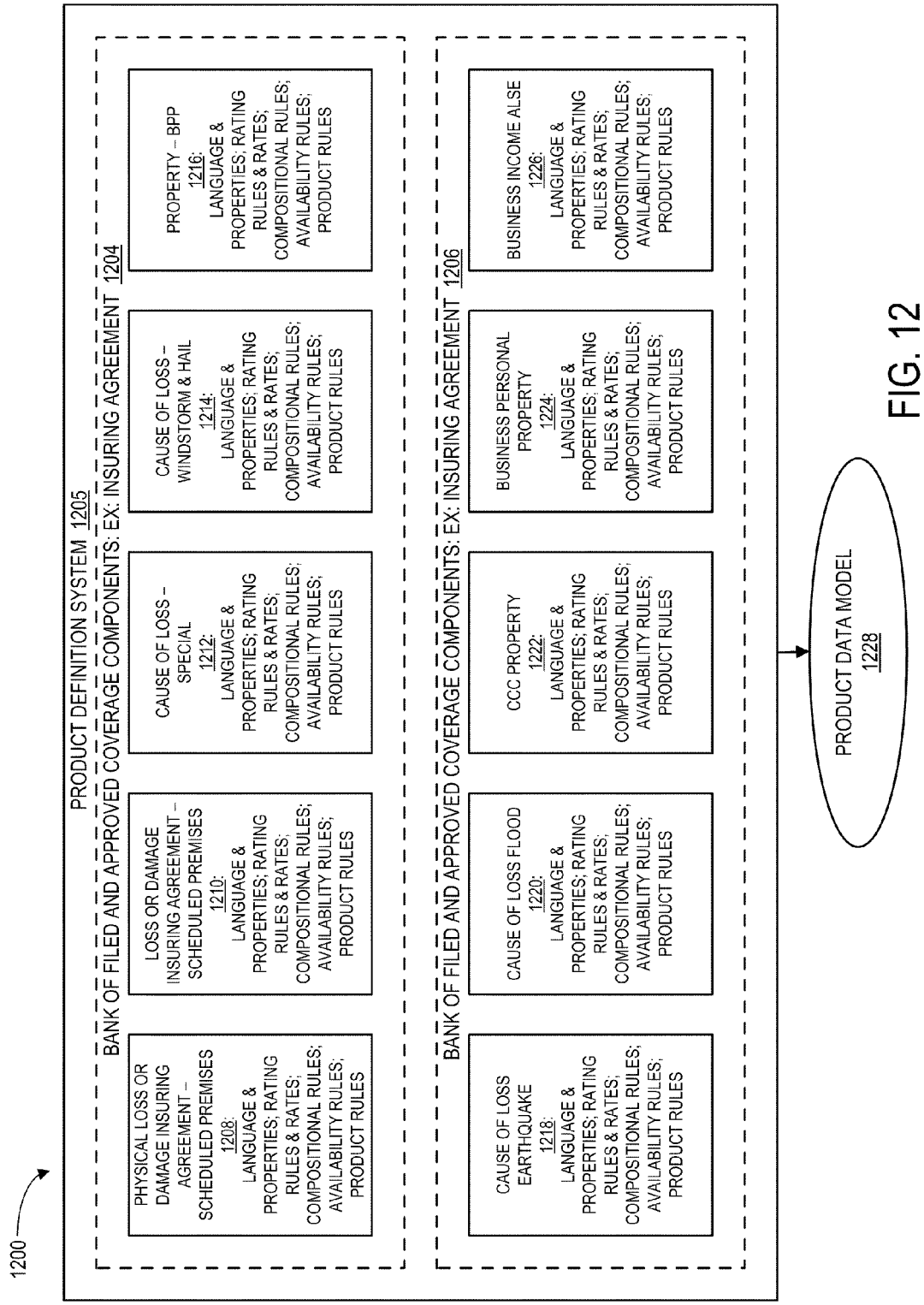
FIGS. 12 and 13 are an illustration of a componentized system, in accordance with some embodiments.
Figure 13:
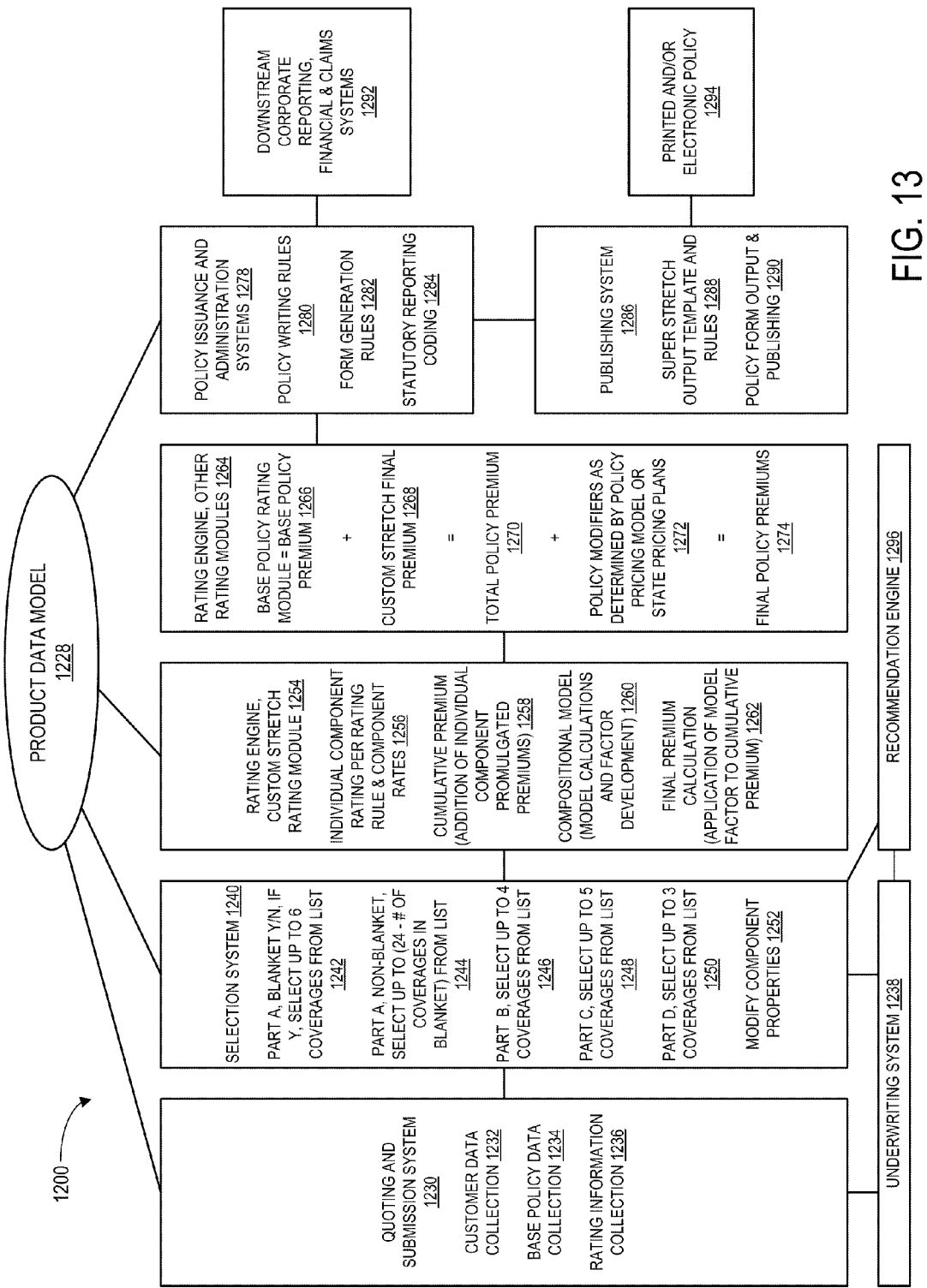

FIGS. 12 and 13 provide an illustrative depiction of an insurance coverage product 1200 (with inputs from a product definition engine 1205 to a product data model 1228 shown in FIG. 12, and outputs from the product data model 1228 shown in FIG. 13), including examples of systems that may utilize the product data model and an example of a process flow from selection, to rules validation (including underwriting), property value selection or setting, rating, policy issuance and into downstream systems. Product definition system 1205 includes two banks of (pre)filed and approved coverage components 1204 and 1206. Each bank includes five components in the example of FIGS. 12 and 13, although fewer, more, and alternative components may be included in some embodiments. In some embodiments and as illustrated by the arrows between the banks of components, some selection options may be made for excluded causes of loss in conjunction with special causes of loss. Furthermore, the selection of the desired and validated components (1208-1226) is assembled to form product data model 1228.

As shown in FIG. 13, product data model 1228 including the selected components and their associated language and properties; rating rules & rates; pricing rules and pricing factors; compositional rules; availability rules; and product rules may be provided to other systems for further processing and manipulation. For example, quoting & submission system 1230 may use the product data model 1228 to automatically (e.g., without human interaction since the product data model is provided in a structure and format that can be understood by system 1230) determine a price quote for the assembled product. Quoting system 1230 may collect, gather, or have access to customer data 1232, base policy data 1234, and rating information 1236 for the various components. Product data model 1228 may also be provided to selection system 1240 that may provide a mechanism for automatically selecting and finalizing the selection of the desired components. As shown, criteria may be associated with each component 1242-1250 selected for inclusion in the coverage being assembled. These associated component criteria may be considered by selection system 1240. System 1252 provides a mechanism to modify component properties, in some embodiments, under certain permissible conditions. As illustrated, the quoting and selection systems are operated based on underwriting rules system 1238.

In some embodiments, recommendation engine 1296 may automatically provide component selection recommendations based on the machine understandable (e.g., semantic) descriptions of the desired coverage product to selection system 1240. Rating engine 1254 may consider the individual component rating associated with the selected components at 1256, a cumulative premium at 1258 based on the addition of the individual components, and a compositional pricing model 1260 that considers the particular combination of components. All of the premium components may be considered to calculate a final premium at 1262. In some aspects, other rating modules and considerations may have an impact on a premium calculation. Systems 1264-1274 illustrate some sample types of other rating modules.

Having selected, combined, and validated coverage components, policy issuance systems, including policy administration system 1278 and publishing system 1286, policy writing rules 1280, form generation rules 1282, and statutory reporting coding may be considered for providing reports at 1292 and/or publishing forms capturing the assembled insurance coverage by publishing system 1286.

An output of publishing system 1286 may be a printed and/or electronically published copy of the policy restating the insurance coverage. An output of the policy administration may be, for example, a report regarding financial data related to the assembled insurance coverage.

In some embodiments, an entity such as, for example, a product manager may compose component based insurance product coverages using an approach using semantic web principles. A semantic web formalism allows the coverage definitions to be used by web services or data on any communications network or device that are distributed across the Internet and supports automatic composition by programs, applications, and services. The semantic description of the coverages and its elements may include, for example, three parts. Namely, classes that represent the generic entities; properties of the classes that can be based on classes, can be based on well known types such as date, float, integer, etc. and can be annotative properties that are used for human consumption but not read by programs; and instances of the classes.

In some embodiments, the representation of the insurance product components and related descriptions of the insurance product coverages may be stored in an XML or other metadata based repository. A sample example repository is attached hereto as Appendix A.

The following includes a disclosure of how a description of a coverage may be created in accordance with some embodiments. In general, an entity such as a product manager follows the process described below to create entities and compose a coverage from those entities. First, entities are created as classes. Secondly, properties are attached to the created and defined classes. Thirdly, instances of the classes are instantiated and instances of other classes as values of properties are used when needed, thereby composing a complex coverage from the components. This process for describing a coverage may be recursively performed for individual entities and for coverages that use those entities.

Figure 14:
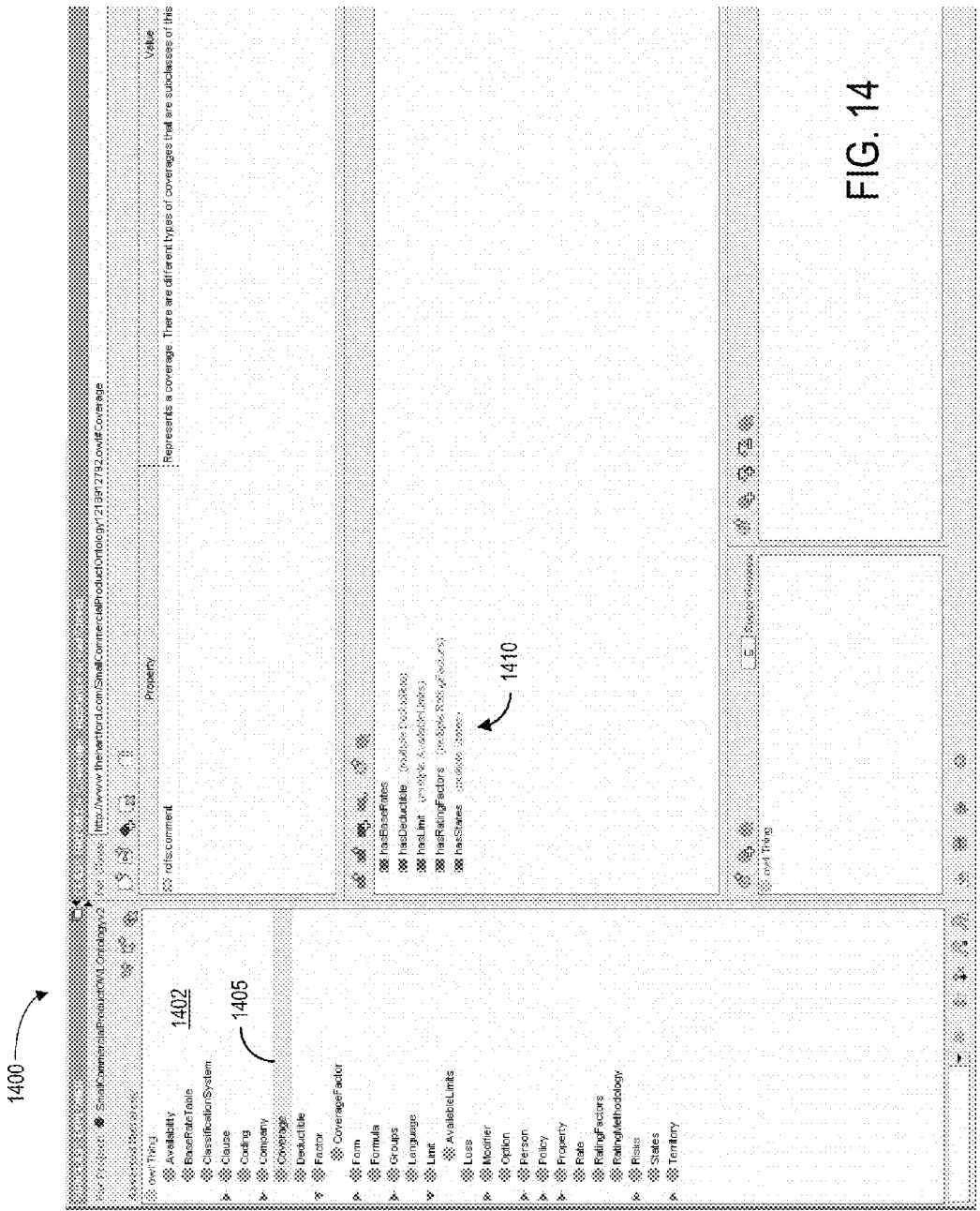
FIG. 14 is an illustration of aspects of a coverage, according to some embodiments.

FIG. 14 illustrates a user interface screen 1400 showing a user interface that may be presented to, for example, a product manager. The user interface screen 1400 may allow the product manager to design classes such that the classes can be composed to create new coverages by interacting with classes of entities 1402 that form parts of coverages, including the coverage class 1405 itself. Each of the entities 1402 may be specialized further, and as needed, to support product definition processes and associated data validation and form generation processes. Product managers may design the classes such that the classes can be composed to create new coverages quickly and the entity definitions can be reused for product definition generation purposes, as well as for reuse of these definitions by policy management systems that may use this knowledge base. In this manner, an advantage of reducing re-programming of on-line systems that use the product definitions may be realized.

It is noted that the classes may further have associated properties, as well as values corresponding to the properties. As an example, coverage class 1405 is shown as having an associated subset of properties 1410.

Figure 15:
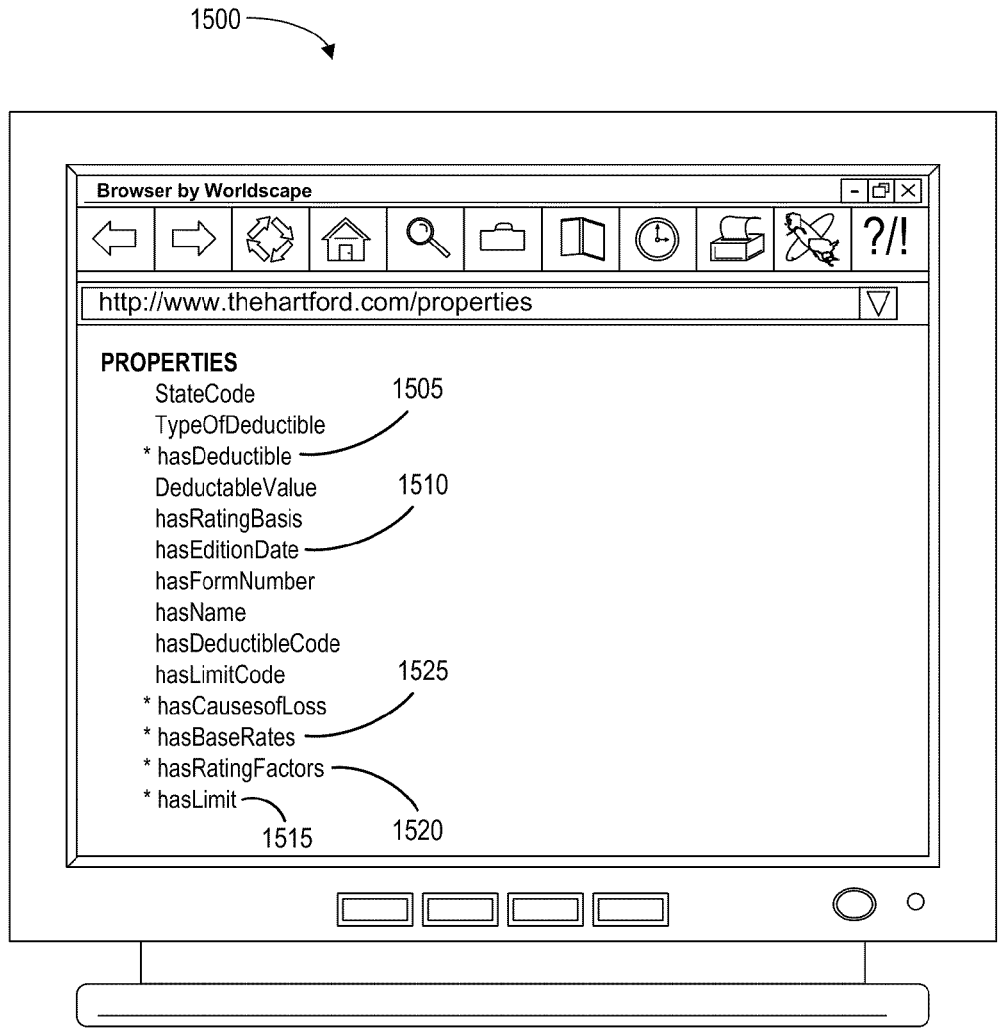
FIG. 15 is an illustration of aspects of an entity class and associated properties, according to some embodiments.

In some embodiments, property definitions may be shared across multiple class descriptions. For example, FIG. 15 shows a portion of a user interface 1500 that presents or displays properties that can be associated with all classes in some embodiments. The properties that have a "*" (asterisk) to the left of them are "Object properties" and the other properties that do not are "Type properties". Object properties values can be constrained to domain specific concepts (e.g., range of values for deductibles or limits), whereas Type properties are restricted to well known computer language properties such as Integer, Float, Date, etc. For example, "hasDeductible" property 1505 values are restricted to instances of the class Deductible, whereas "hasEditionDate" 1510 is restricted to "Date" type. Properties are also created to promote reuse of properties across entities. For example, properties such as hasLimit 1515, hasRatingFactors 1520, and hasBaseRates 1525 may be used by multiple different coverage types. The sharing of property definitions reduces re-programming of systems that use product definitions.

Figure 16:
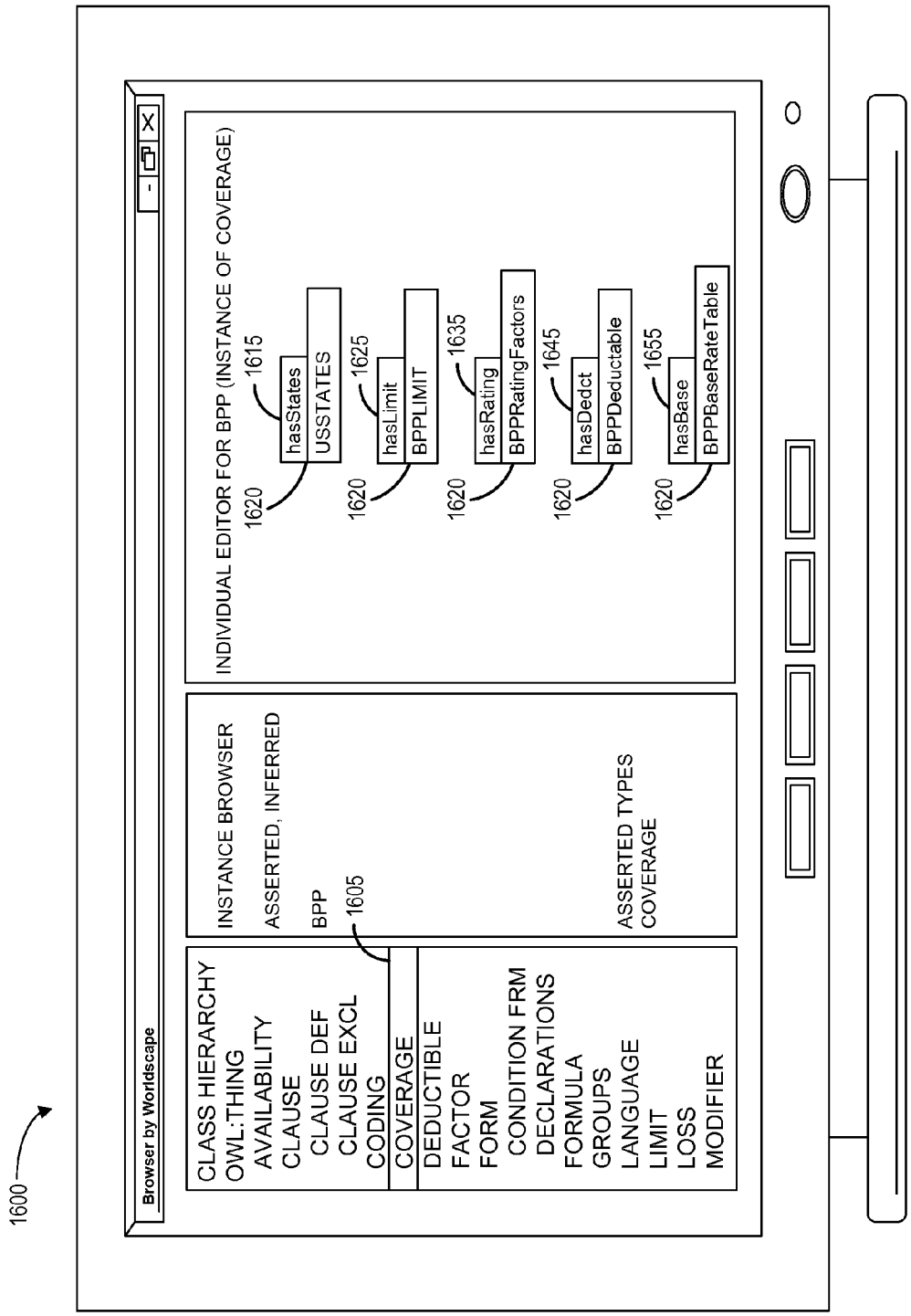
FIG. 16 is an illustration of aspects of an entity class and associated properties and values, according to some embodiments.

A particular type of coverage, for example a Business Personal Property (BPP) coverage may be developed using systems and methods herein by creating an instance of the desired coverage class and by further providing values for its associated properties listed in the display 1500 of FIG. 15. FIG. 16 illustrates an example of how an instantiation BPP 1610 of a coverage 1605 may appear in a product manager's design workstation 1600. As shown, a number of property—value pairs (e.g., 1615/820, 1625/830, 1635/840, 1645/850, and 1655/860) are depicted on screen 1600.

Accordingly, FIGS. 13-16 demonstrate how component coverages may be composed from classes having associated properties and values and instantiated for specific types of coverages. As discussed, design classes and properties may be created and defined to promote reuse of classes and properties and individual coverages may further be created as a composition of those classes and properties.

In some embodiments, a product ontology generated by an insurance product process may create products, objects and constraints that may, generally, be grouped into three groupings. The three groupings can include: (i) Definitions of products (e.g., coverages) including the classes that are instantiated to create the coverage, properties of the instances, and the values of the properties; (ii) Constraints that define valid values that properties may have and constraints that define compositional restrictions when component elements are combined to create a coverage; and Constraints that are time sensitive (e.g., when a coverage becomes active) and constraints that take into account the type of customer being targeted by the coverages (e.g., renewal customers vs. new business customers), and (iii) Data validation rules that can be used by systems such as quoting, policy administration and underwriting systems. These concepts may be described in a manner that consuming systems can understand the full semantic meaning of these concepts without a need for human intervention.

Table 1 includes a listing of an example of a class description using the XML presentation syntax for OWL (the Web Ontology Language). The use of OWL may provide a number of benefits including, for example, the capability of creating classes, properties, defining instances and its operations. Such use may allow coverage definitions to be created to provide a full semantic description of the rules and constraints associated with a given coverage. Those skilled in the art will appreciate that other schemas that allow similar presentation syntaxes may also be used. As show below, the class describes an Endorsement which is a sub-class of a more generic class called Form. The Endorsement class has properties such as RatingFactors, Limit, and MarketGroups to which the endorsements can apply.

TABLE 1

```
<owl:Class rdf:ID="Endorsement">
    <rdfs:subClassOf>
        <owl:Class rdf:ID="Form"/>
    </rdfs:subClassOf>
</owl:Class>
<owl:Class rdf:ID="RatingFactors"/>
<owl:Class rdf:ID="Limit"/>
<owl:Class rdf:ID="MarketGroups">
    <rdfs:subClassOf>
        <owl:Class rdf:ID="Groups"/>
    </rdfs:subClassOf>
    <rdfs:comment rdf:datatype="http://www.w3.org/2001/
      XMLSchema#string"
    >Market Groups used in rating rules. Anywhere else?
    </rdfs:comment>
</owl:Class>
```

Table 2 illustrates a value restriction example. The example of Table 2 describes states to which a particular coverage can be marketed. The enumerated list of states is described as elements of the class called StateCode.

TABLE 2

```
<owl:DatatypeProperty rdf:ID="StateCode">
    <rdfs:comment rdf:datatype="http://www.w3.org/2001/XMLSchema#string"
    >two character code for state</rdfs:comment>
    <rdfs:domain rdf:resource="#States"/>
    <rdfs:range>
        <owl:DataRange>
            <owl:oneOf rdf:parseType="Resource">
                <rdf:rest rdf:parseType="Resource">
                    <rdf:rest rdf:parseType="Resource">
                        <rdf:first rdf:datatype="http://www.w3.org/2001/XMLSchema#string"
                        >ma</rdf:first>
                        <rdf:rest rdf:parseType="Resource">
                            <rdf:first rdf:datatype="http://www.w3.org/2001/XMLSchema#string"
                            >tx</rdf:first>
                            <rdf:rest rdf:resource="http://www.w3.org/1999/02/22-rdf-syntax-ns#nil"/>
                        </rdf:rest>
                    </rdf:rest>
                    <rdf:first rdf:datatype="http://www.w3.org/2001/XMLSchema#string"
                    >az</rdf:first>
                </rdf:rest>
                <rdf:first rdf:datatype="http://www.w3.org/2001/XMLSchema#string"
                >al</rdf:first>
            </owl:oneOf>
        </owl:DataRange>
    </rdfs:range>
</owl:DatatypeProperty>
```

Table 3 shows an example of a complete coverage definition with specific restrictions on values and compositional constraints. The coverage name is named BPP and has properties such as hasDeductible, hasBaseRateTable, hasStates, etc. with each of the properties specifying the values that are assigned to those properties.

TABLE 3

```
<Coverage rdf:ID="BPP">
  <hasDeductible>
    <Deductible rdf:ID="BPPDeductible">
      <DeductibleValue rdf:datatype="http://www.w3.org/2001/XMLSchema#float"
      >700.0</DeductibleValue>
      <DeductibleValue rdf:datatype="http://www.w3.org/2001/XMLSchema#float"
      >500.0</DeductibleValue>
      <DeductibleValue rdf:datatype="http://www.w3.org/2001/XMLSchema#float"
      >200.0</DeductibleValue>
      <TypeOfDeductible
rdf:datatype="http://www.w3.org/2001/XMLSchema#string"
      >AccountsReceivable</TypeOfDeductible>
      <TypeOfDeductible
rdf:datatype="http://www.w3.org/2001/XMLSchema#string"
      >BPP</TypeOfDeductible>
      <rdfs:comment rdf:datatype="http://www.w3.org/2001/XMLSchema#string"
      >an example individual instance for BPP coverage</rdfs:comment>
    </Deductible>
  </hasDeductible>
  <hasBaseRates>
    <BaseRateTable rdf:ID="BPPBaseRateTable">
      <BaseRateTableValue
rdf:datatype="http://www.w3.org/2001/XMLSchema#float"
      >2.0</BaseRateTableValue>
      <BaseRateTableValue
rdf:datatype="http://www.w3.org/2001/XMLSchema#float"
      >1.1</BaseRateTableValue>
      <BaseRateTableValue
rdf:datatype="http://www.w3.org/2001/XMLSchema#float"
      >1.0</BaseRateTableValue>
    </BaseRateTable>
  </hasBaseRates>
  <hasStates>
    <States rdf:ID="USStates">
      <StateName rdf:datatype="http://www.w3.org/2001/XMLSchema#string"
      >alaska</StateName>
      <StateName rdf:datatype="http://www.w3.org/2001/XMLSchema#string"
      >arizona</StateName>
      <rdfs:comment rdf:datatype="http://www.w3.org/2001/XMLSchema#string"
      >States in America</rdfs:comment>
      <StateCode rdf:datatype="http://www.w3.org/2001/XMLSchema#string"
      >al</StateCode>
      <StateCode rdf:datatype="http://www.w3.org/2001/XMLSchema#string"
      >az</StateCode>
    </States>
  </hasStates>
  <hasRatingFactors>
    <RatingFactors rdf:ID="BPPRatingFactors">
      <rdfs:comment rdf:datatype="http://www.w3.org/2001/XMLSchema#string"
      >rating factors for BPP</rdfs:comment>
      <FactorValue rdf:datatype="http://www.w3.org/2001/XMLSchema#float"
      >0.0</FactorValue>
    </RatingFactors>
  </hasRatingFactors>
  <rdfs:comment rdf:datatype="http://www.w3.org/2001/XMLSchema#string"
  >Basic Property Coverage as Part of the Spectrum Program</rdfs:comment>
  <hasLimit>
    <AvailableLimits rdf:ID="BPPLimits">
      <LimitValues rdf:datatype="http://www.w3.org/2001/XMLSchema#int"
      >100</LimitValues>
      <LimitValues rdf:datatype="http://www.w3.org/2001/XMLSchema#int"
      >200</LimitValues>
    </AvailableLimits>
  </hasLimit>
</Coverage>
``` may use an ontology according to the present disclosure to change interactions between a product creation process and other business processes within and outside of their firewalls (e.g., quoting, claims, etc.). Additionally, the entity may change their regulatory form filing processes in a fundamental way. For example, instead of or in addition to filing final In some embodiments, an entity such as, for example, an insurance carrier may use a two tiered approach to integrate an ontology in accordance with the present disclosure with their operational and filing processes. For example, the entity coverages, rating factors, etc., the entity may also file some basic component classes, specialized classes created to support coverages, coverages, and composition rules. This component level filing may allow the entity to create new coverages without having to get each of the new coverages approved. The states approve the basic component elements and the rules of composition (e.g., rating algorithm, allowable combinations, etc.), and the coverages are assembled and created based on the approved components and associated rules.

Figure 17:
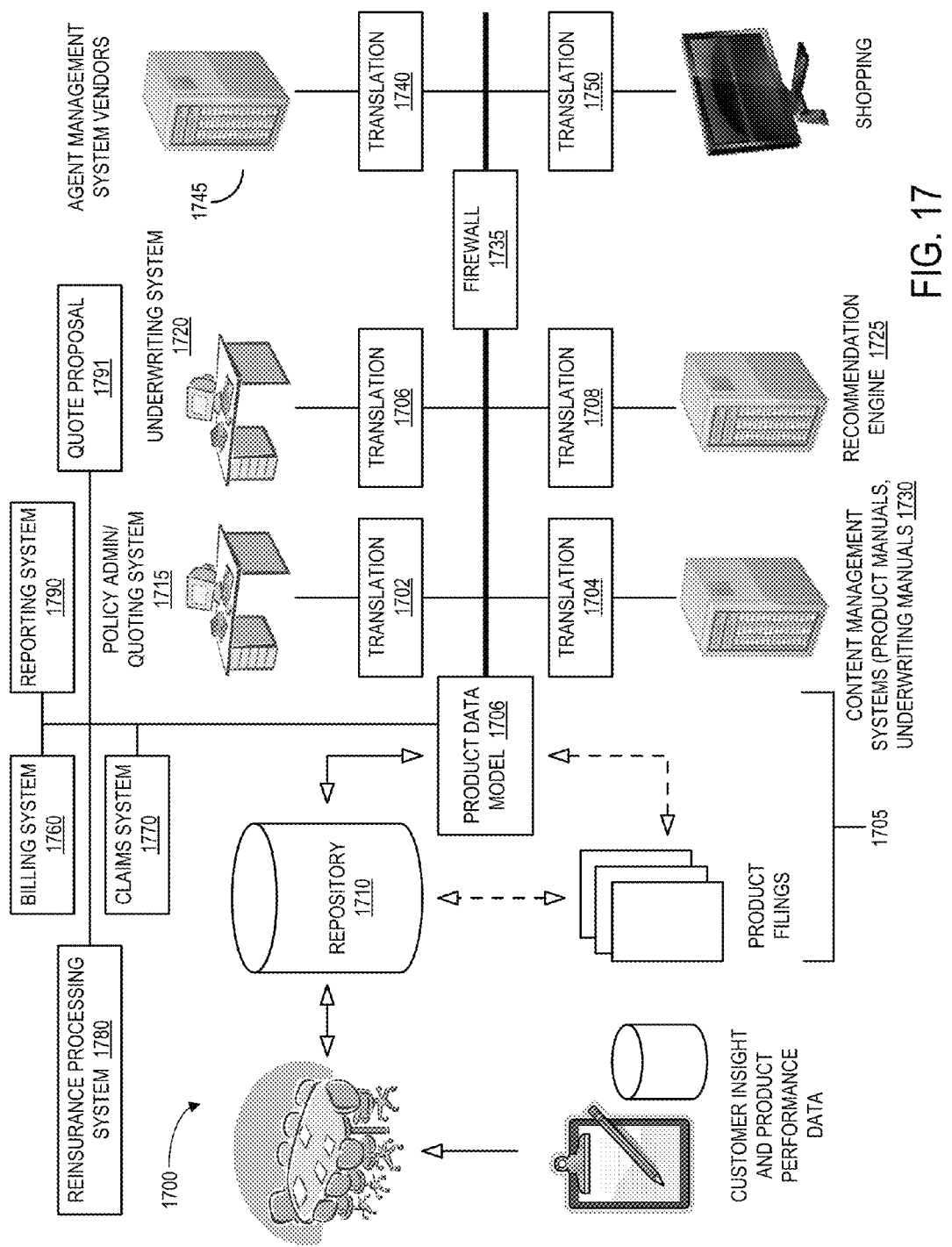
FIG. 17 is a simplified representation of a network of systems related to componentized methods and systems herein, according to some embodiments.

FIG. 17 is an illustrative system architecture that may be used in conjunction with some embodiments herein. In some aspects, an XML based description of an insurance product based on components may be translated before being consumed by other systems. FIG. 17 illustrates one possible implementation of system architecture for consuming product descriptions as described herein. A product creation process/system 1705 may produce data and information that is stored in or on self describing product repository 1710. For example, customer insights and historical product performance data might be reviewed and used to describe components in the repository 1710. Note that at least some of the components in the repository 1710 might be submitted as product filings to various state insurance regulators. Repository 1710 may be stored as a network accessible database or data store that can be accessed within and outside of an entity's (e.g., an insurance company) firewall. Yet within the entity's firewall, systems including, but not limited to quoting system 1715, underwriting system 1720, recommendation engine 1725, and content management system 1730 may consume the ontology in the product repository 1710 through translation processes 1702, 1704, 1706, and 1708 that adapt the descriptions to the internal formats needed by these systems 1715-1730. In some embodiments, external to the corporate firewall 1735, vendors 1745 and others that, for example, sell agency management systems could use their own translation processes 1740 or one provided by the insurance company to import and use the ontology in support of data integration with an insurance carrier. Also shown, is a shopping engine 1755, such as one by eAgents or by the carrier themselves, may also consume the product repository ontology 1710 using its own proprietary translations 1745 or one provided by the insurance carrier. Moreover, a billing system 1760, a claims system 1770, a reinsurance processing system 1780, a data warehousing and/or reporting system 1790, a quote proposal or output publishing technology, 1791 may access and/or consume information from the product data model 1706. Further, in some embodiments insurance coverage and/or product definition may then be produced and shared with other insurance product component storage units or combined with translators to use in other systems or network processes.

In this manner, insurance products may be provided based on components that may be created, filed and approved by a regulating entity (if need be), used, and reused to dynamically assemble and creation insurance products. As demonstrated herein, the process of describing and creating the components, and the insurance products dynamically created using those created components provides an efficient and flexible mechanism for creating a diverse variety of products. In some aspects, the components disclosed herein may be used across more than one type or category of insurance line. The ontology of the components, including the properties and attributes associated with the class entities, provides an enhanced degree of system and methodology flexibility, versatility, and intelligence.

Figure 18A:
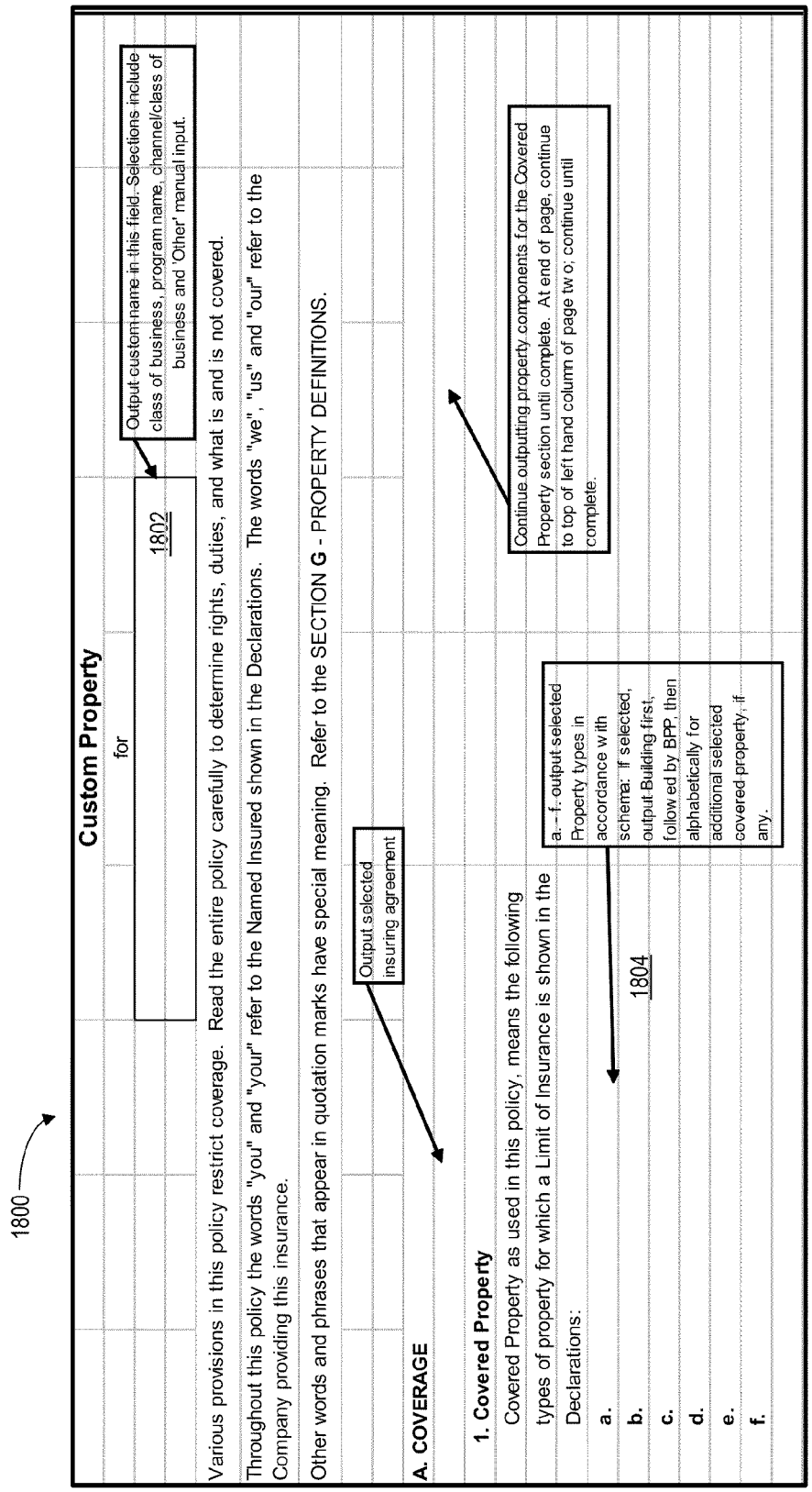
FIGS. 18A-18K relates to a form template, according to some embodiments.

FIGS. 18A-18K collectively provide an example of a GUI display 1800 associated with a template for an insurance coverage product output by methods and systems, according to embodiments herein. Note that the display 1800 and/or other templates may be provided on a computer monitor to allow interaction by a product manager. In the present example, the insurance coverage product is a custom property insurance coverage policy based on and created using components as disclosed herein.). FIG. 18A provides for entry of a custom name for the insurance product at 1802, as well as specification of property types covered by the product. Note that the customer name may be output at field 1802 and selections might include a class of business, program name, channel/class of business or other manual input. Moreover, fields 1804 might include selected property types in accordance with a schema.

Figure 18B:
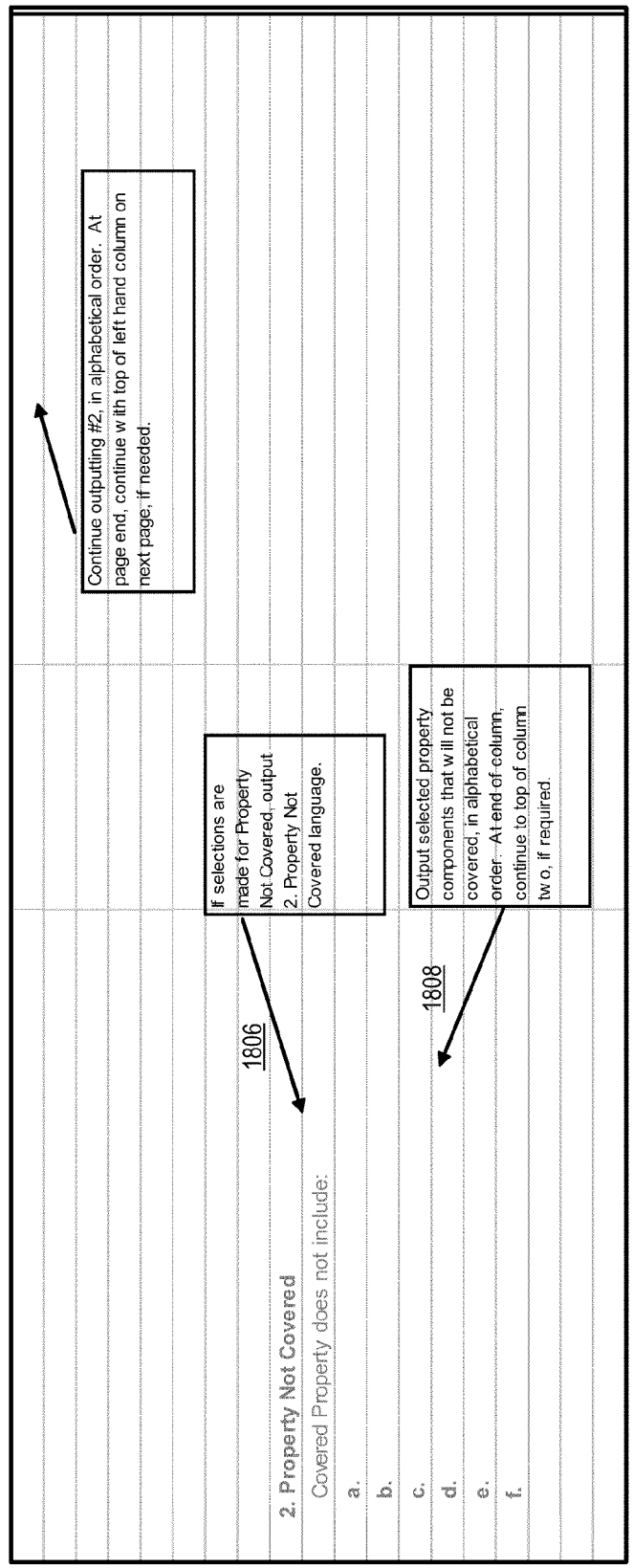
Figure 18C:
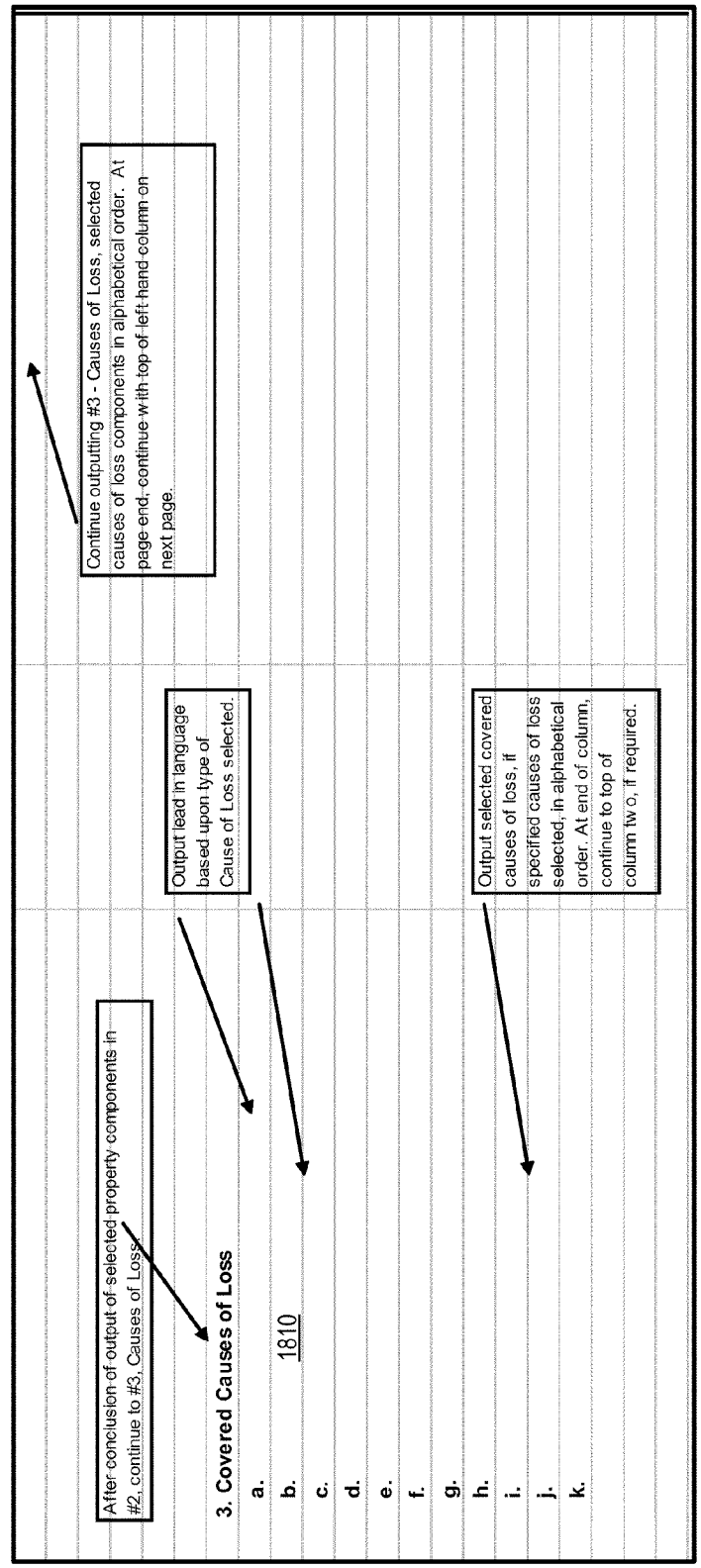
Figure 18D:
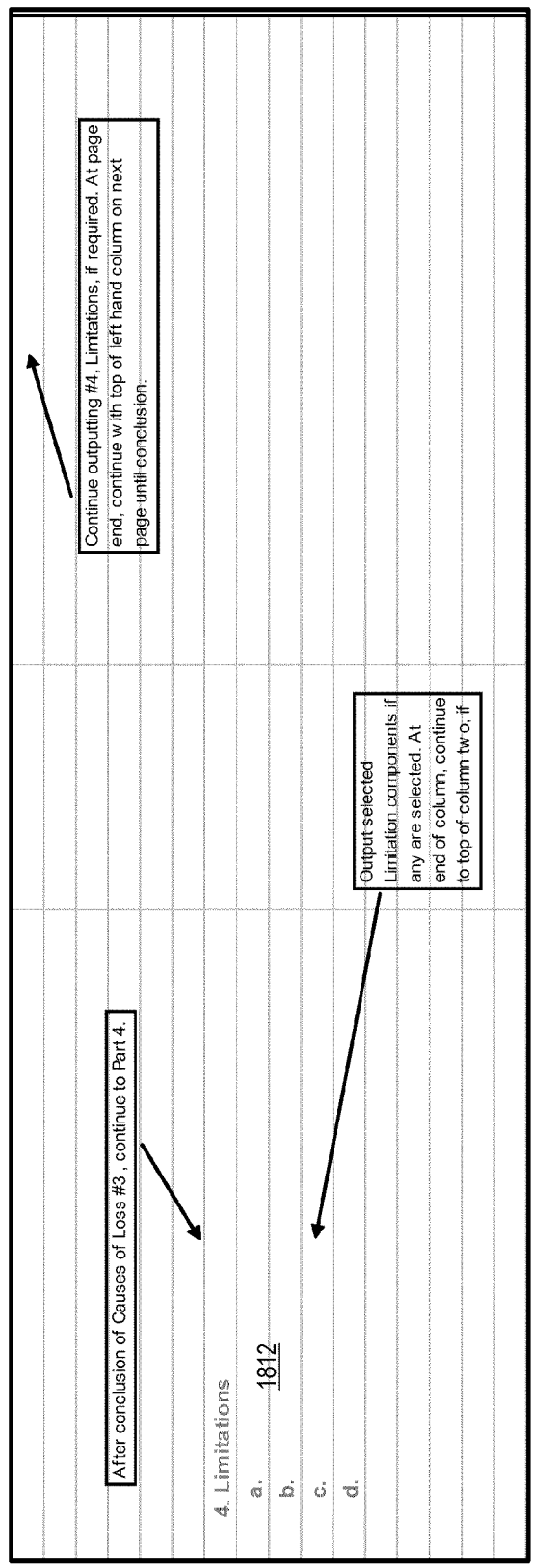
Figure 18E:
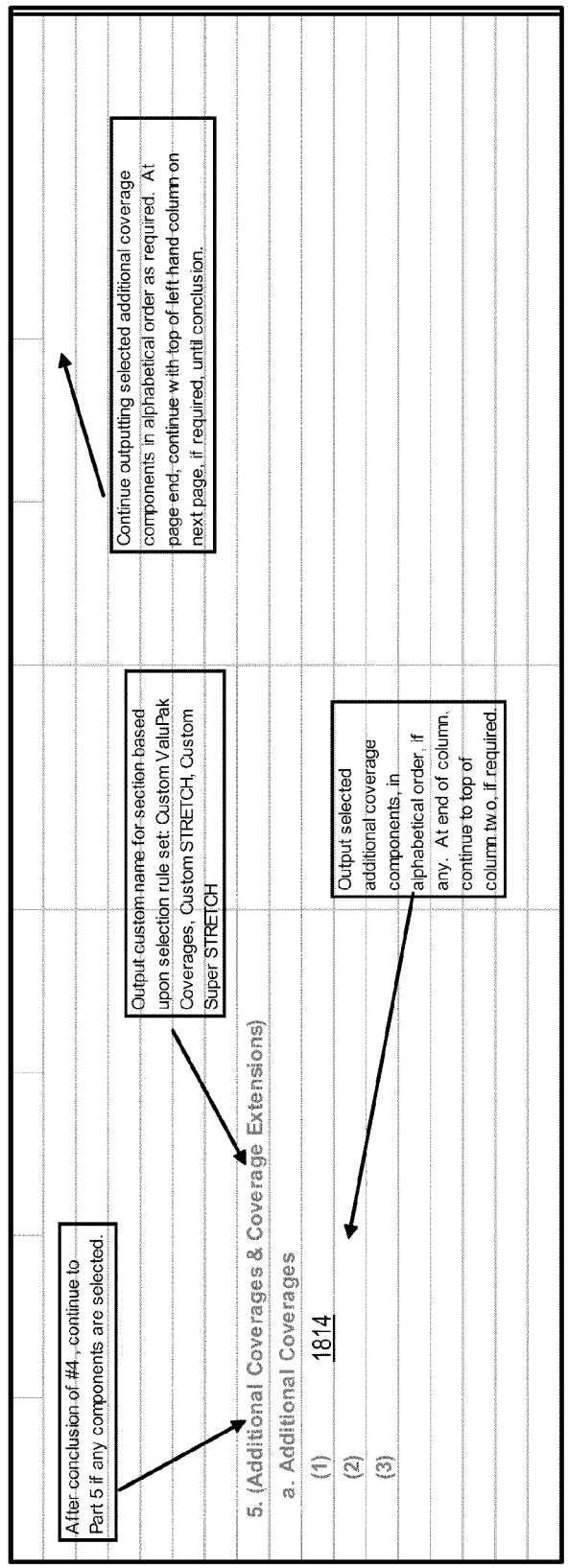

FIG. 18B illustrates a mechanism for specifying property not covered by the example product at 1806 and 1808. Note that selections might be output in alphabetical order. As illustrated, ample opportunity is provided to list both property to be covered and property not to be covered in FIGS. 18A and 18B. FIG. 18C of the template illustrates locations for a designer of the custom property policy to specify the covered causes of loss to be included in the output product, and FIG. 18D lists the limitations components, if any, selected for inclusion in the product. In particular, fields 1810 might indicate covered causes of loss based on user selections and fields 1812 might reflect limitation components (if any have been selected). FIG. 18E further highlights the flexibility of insurance coverages that may be created by the methods and systems herein by, for example, providing a mechanism for entry of additional (non-standard) coverages and coverage exceptions at 1814 (e.g., custom names based upon a selection rule set (e.g., custom value pack coverages and or stretch products).

Figure 18F:
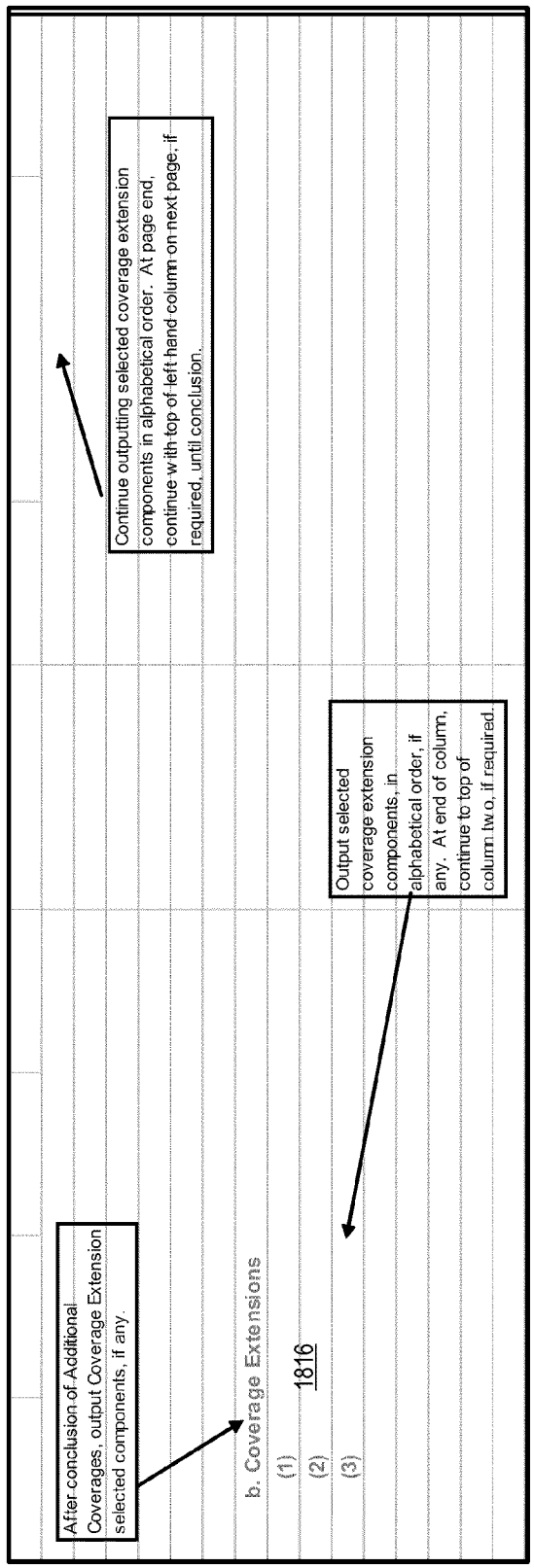
Figure 18G:
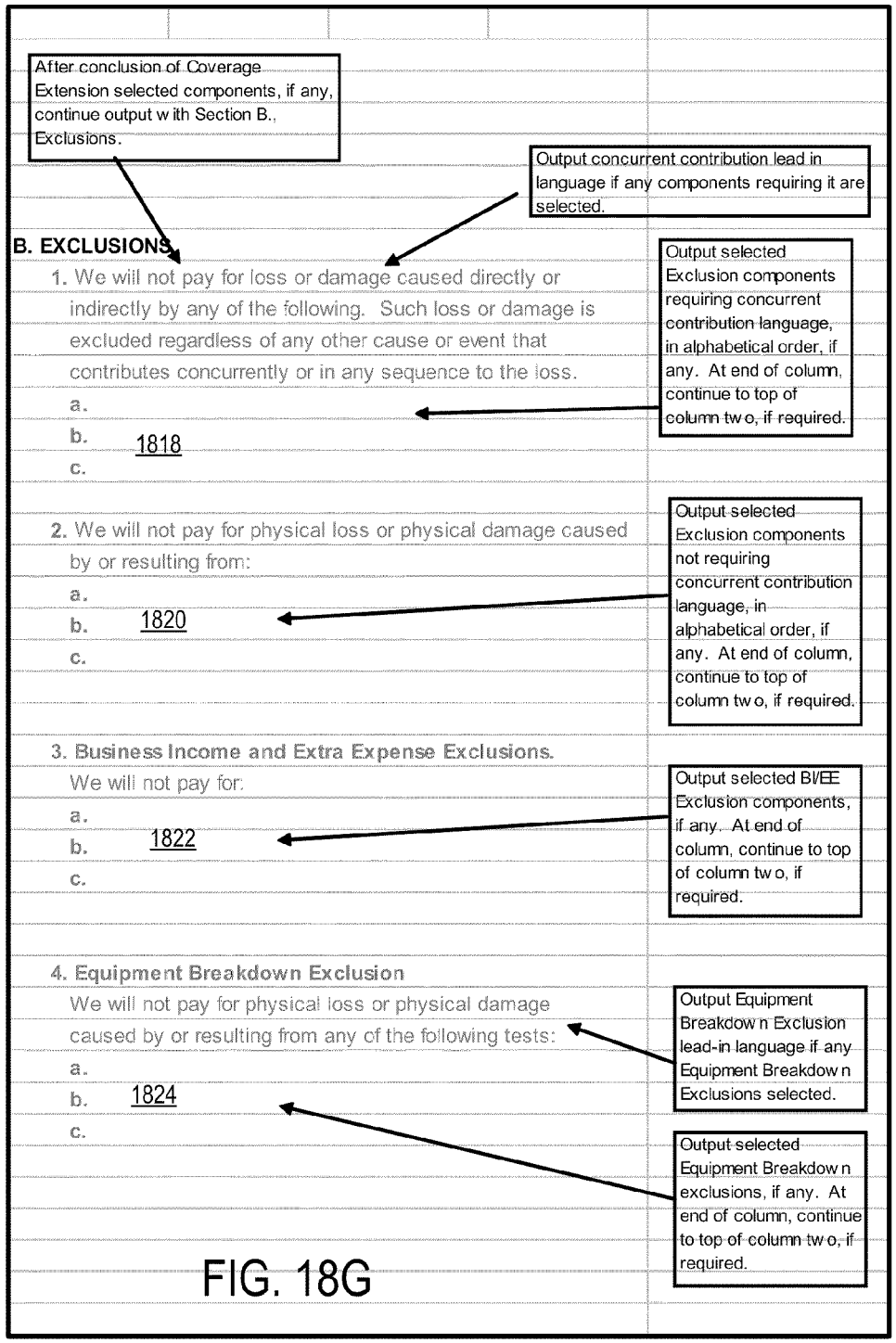
Figure 18H:
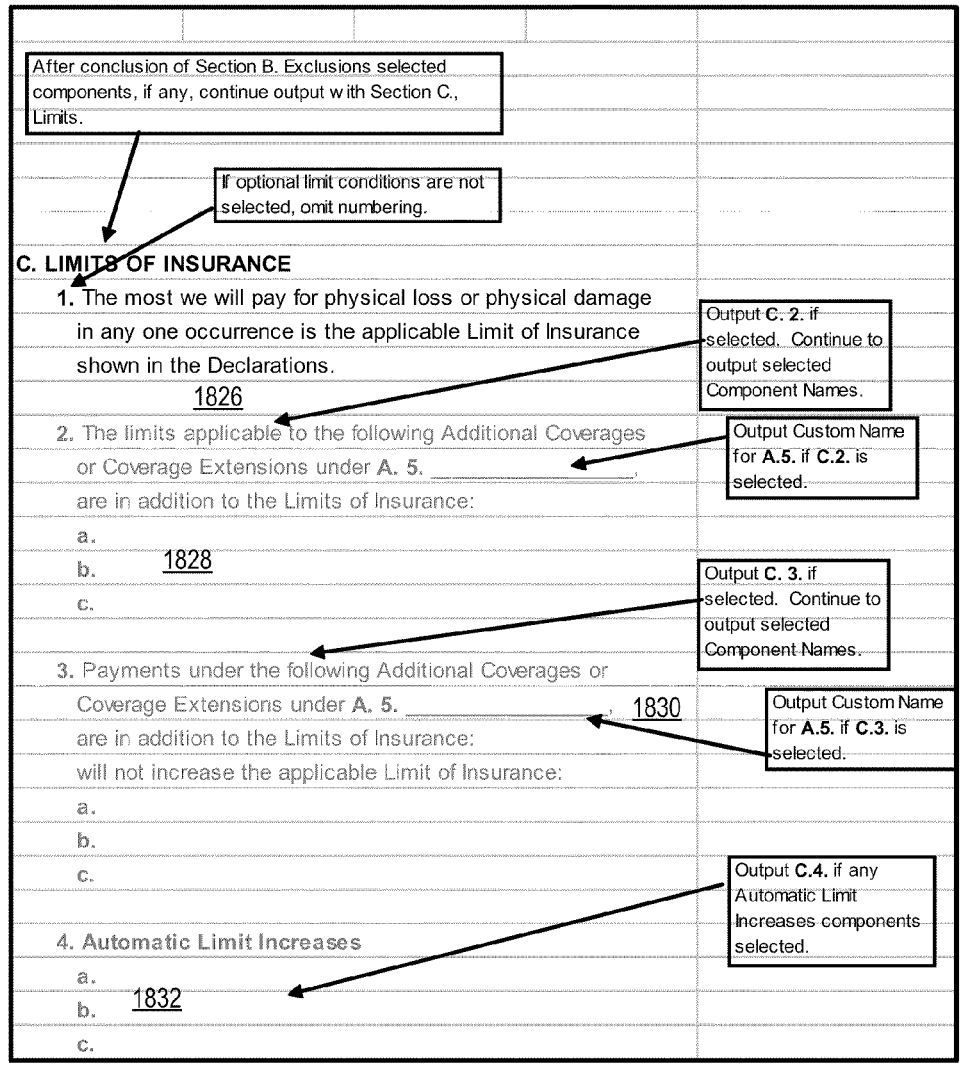

Continuing to FIG. 18F, coverage extensions may be accounted for and included in the insurance product by specifying coverage extension components at 1816. Note that output may be associated with selected coverage extension components, in alphabetical order, if any. FIG. 18G further illustrates the flexibility and customization that may be facilitated by the methods/systems herein. For example, various types of exceptions may be specified at 1818-1824 by the inclusion of pre-filed and approved components at the appropriate "exclusions" locations. In particular, exclusion components requiring concurrent contribution language 1818, exclusion components not requiring concurrent contribution language 1820, business income and extra expense exclusion components 1822, and equipment breakdown exclusion components 1824 may be provided on the GUI display 1800.

Figure 18I:
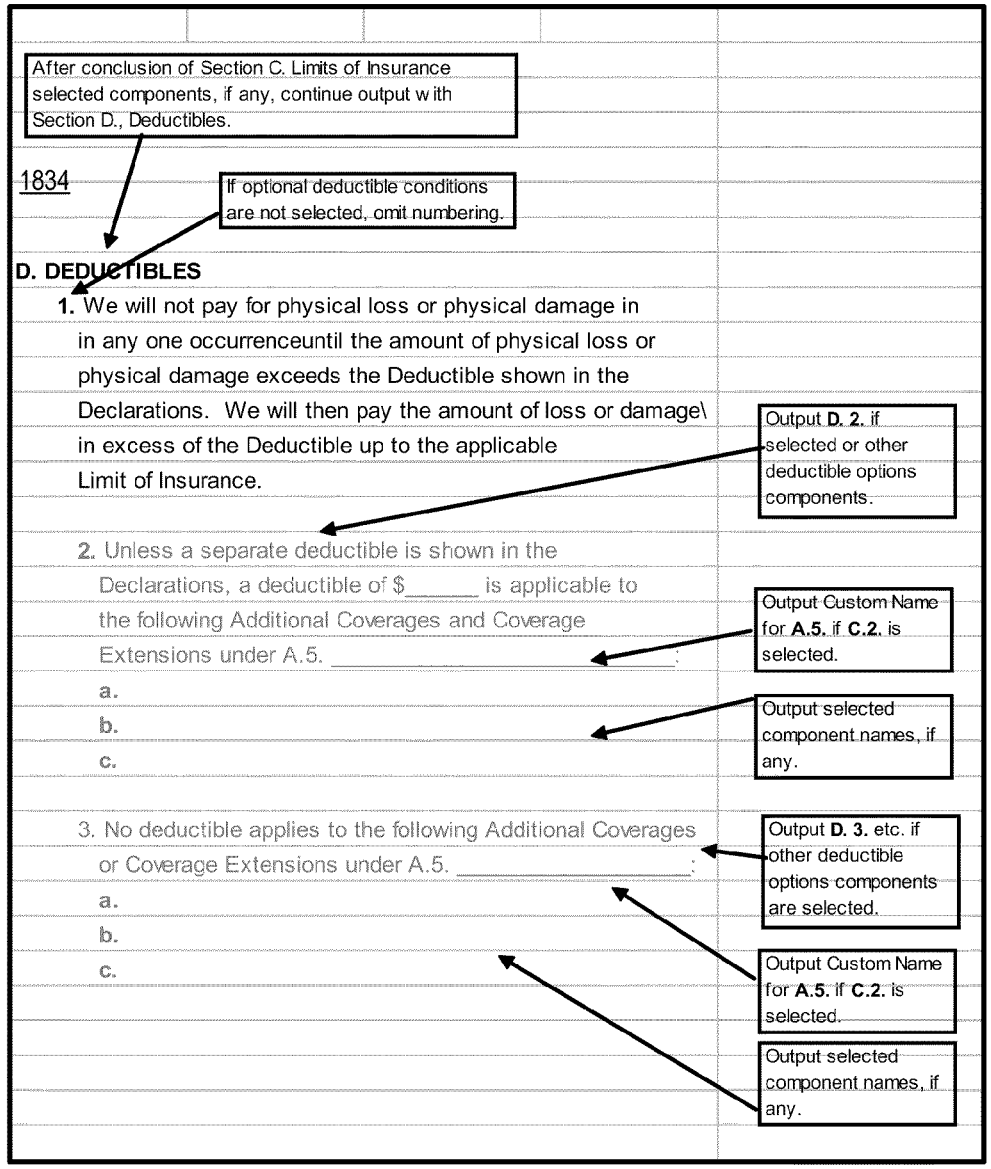
Figure 18J:
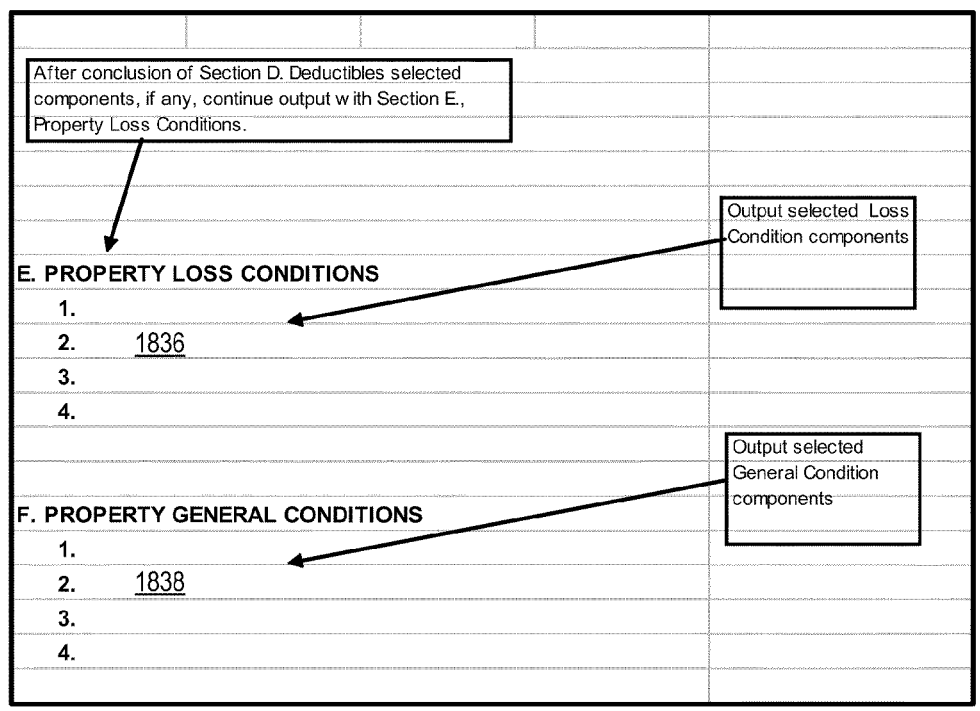
Figure 18K:
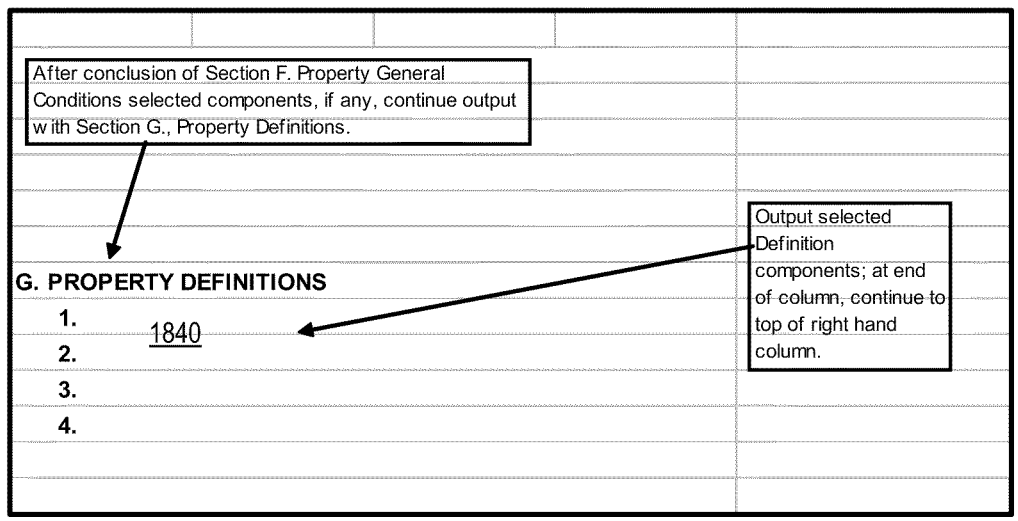

In a like manner, components that relate to "limits of insurance" may be selected and specified at 1826, 1828, and 1830. For example, the GUI display 1800 could include optional limit conditions 1826, additional coverages or coverage extensions 1828, customer names 1830, and/or automatic limit increases 1832. FIG. 18I illustrates how components directed to "deductibles" may, if at all, be selected and included via the GUI display 1800 in the product at field 1834. FIG. 18I further provides entry locations for providing the details related to selected and included deductibles. FIG. 18J relates to selected components, if any, for defining property loss conditions, 1836, and property general conditions 1838. FIG. 18G illustrates how a product may offer the flexibility of defining property definitions, if at all, at 1840.

Accordingly, the coverage output template GUI display 1800 depicted in FIGS. 18A-18K illustrates a wide variety and types of components that may be created and used to create an insurance product customized to a customer's needs. As shown, the customization provided by the component based methods and systems herein may be extended to a granular level that offers much flexibility and diversity of products (e.g., outputs).

Figure 19A:
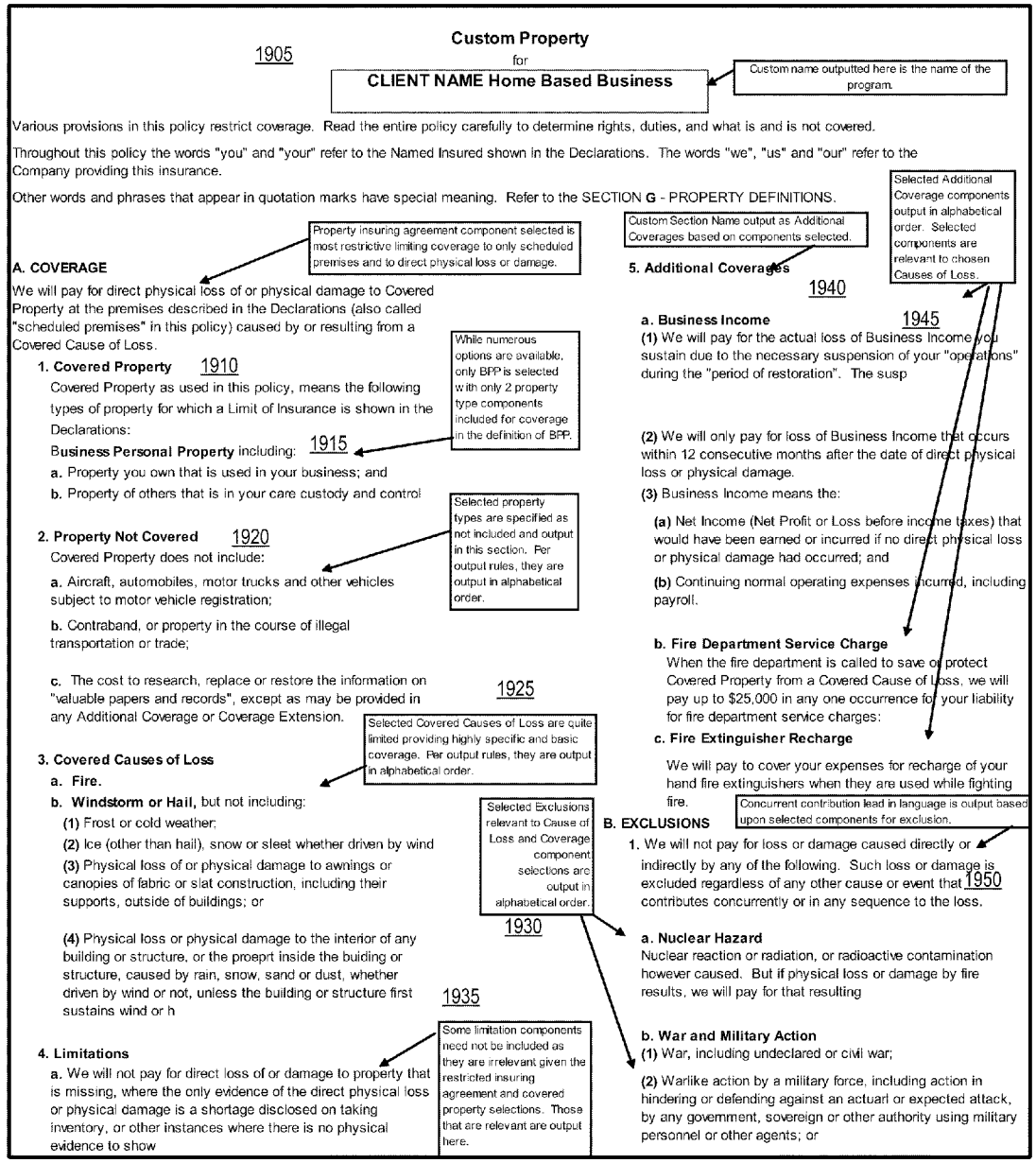
Figure 19B:
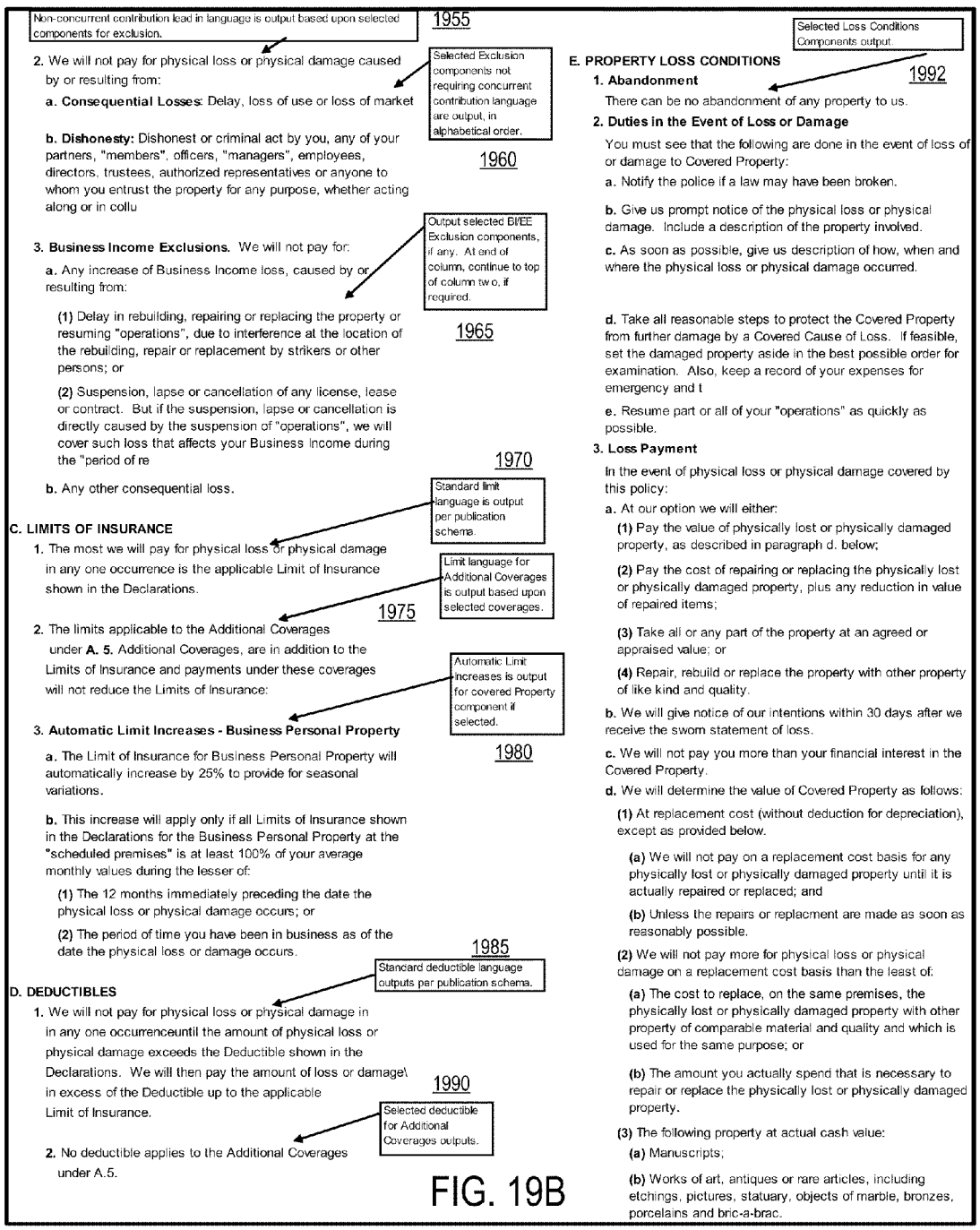

FIGS. 19A-19C represent a GUI display 1900 associated with a Custom Property form that can be created using the components and rules sets disclosed herein. In particular, a form related to a Home Based Business (HBB) is shown on the display 1900. This product may be suitable for an entity that may want to insure themselves for certain "basic" coverages. In this example, there are annotations that describe the use of the components to populate the template and create the coverage offering. Briefly, the custom name for the form is specified at 1905. Coverages selected and included in the form are first specified. Included types of coverages comprise covered property 1915, property not covered 1920, covered causes of loss 1925, specified limitations 1935, and additional coverages 1940 and 1945. The selected components comprising the example form also include exclusions 1950, 1955, 1960, and 1965. The present example form further includes "limits of insurance" as defined by various components 1970, 1975, and 1980. Deductibles are defined by the selected components 1985 and 1990, whereas property loss conditions are specified by the components included under 1992. This form concludes with components related to "property general conditions" 1994 and "property definitions" 1996.

Figure 20B:
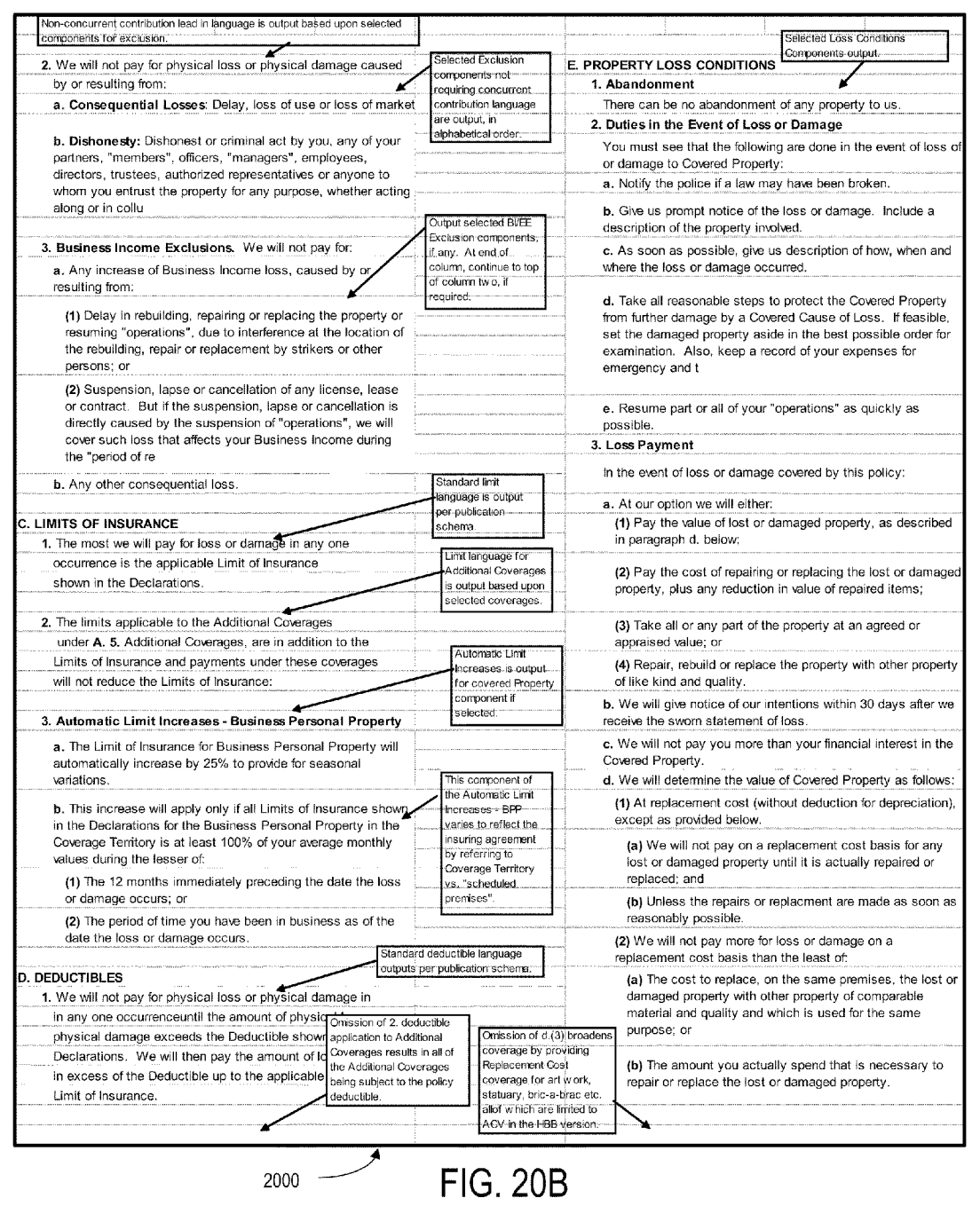

FIGS. 20A-20C also relate to a Custom Property form that can be created using the methods and systems of insurance components and rule sets disclosed herein. In the example of FIGS. 20A-20C, a form related to Outpatient Healthcare risks, such as Doctor's Offices. As compared to the HBB example of FIGS. 11A-11C, the Outpatient Healthcare form of FIGS. 20A-20C is more complex and robust. However, as can be seen from a review of FIGS. 20A-20C and the annotations included therein, the component based insurance product structure and forms disclosed herein can be used to efficiently and dynamically define and encompass complex insurance products. The annotations demonstrate how the use of different components or the omission of certain components expands or contracts the coverage offering.

FIGS. 21A-21D comprise a tabular listing or spreadsheet database 2100 or display associated with a plurality of components that may be created, provided, or otherwise accessible for the creation of insurance coverages and other uses. The database 2100 might be associated with, for example, the insurance product component storage unit 210 of FIG. 2, the component database of FIGS. 4 and 5, and/or the repository 1710 and/or product data model 1706 of FIG. 17. The numerous components in the FIGS. 21A-21D may cooperate to provide a granular level of components for creating insurance coverage products. Referring to FIG. 21A, as an example, the components are listed in column 2105. Various properties and other attributes associated with the components may be provided in additional columns. Values for the properties and other attributes associated with each component in column 2105 are provided in the same row as the subject component. Some of the component properties and attributes might include a component tag, a component type, and/or the text language associated with a component at column 2120. The language text may provide the language that will appear on a form created to include particular component. Product rules 2125 states and defines the conditions and criteria that should be validated or satisfied to include the component in a coverage, including but not limited to which other components can or cannot be combined with the component. Rating base 2130, rating algorithm 2135, and rating rules 2140 relate to the rating criteria of the associated component. The limit options at 2145 detail the types of limits, if any, associated with the components. The rate/factor value at 2150 provides a value for a factor used in the determination of the rating for each component.

FIGS. 21A-21D provide a plurality and variety of sample components and associated properties. However, it should be appreciated that the listing of components therein is not and is not intended to be an inclusive and/or exhaustive listing of all possible or contemplated components and/or their properties and values options. As such, FIGS. 21A-21D are included to illustrate some embodiments of components, in accordance with some embodiments herein.

FIG. 22 provides an illustrative representation of a compositional model example 2200, according to some embodiments. FIG. 22 lists factors that may be considered in pricing an insurance product based on a composition of components as disclosed herein. The compositions of coverages 2205 and the customer characteristics 2210 used in adjusting and/or determining a premium for the example coverage is shown in tabular listing 2200. Also illustrated is whether the particular components of the coverage 2205 and the customer characteristics 2210 have an impact on the exposure 2215 and the expense of the sample coverage. Thus, FIG. 22 illustrates an interaction between the compositional components and the customer characteristics on the pricing of a component based product.

The embodiments described herein are solely for the purpose of illustration. Those in the art will recognize that other embodiments may be practiced with modifications and alterations limited only by the claims.

What is claimed is:

1. An automated processing system, comprising:
a component storage unit storing a plurality of individually selectable components of an insurance coverage, each of the plurality of components having one or more associated properties defining attributes of the component and one or more values associated with the properties, wherein none of the components are stand alone insurance coverages and further wherein at least some of the components are pre-filed with and approved by a regulatory entity having regulatory jurisdiction regarding the insurance coverage and the components include at least all of: a covered property component, a property not covered component, a covered cause of loss component, an exclusion component, a deductible component, and a definition component;
a processor coupled to the component storage unit; and
an instruction storage unit in communication with said processor and storing instructions adapted to be executed by said processor to:
display to a user a first set of potential components via a graphical user interface;
facilitate individual selection of a plurality of the components from the first set by the user to include in an insurance coverage product;
automatically retrieve and execute at least one rule associated with the selected components;
based upon execution of the rule, automatically display a second set of potential components to the user via the graphical user interface, the second set of components being further determined based on the set of selected components and information about the user providing the selection;
facilitate individual selection of a plurality of the components from the second set by the user to include in the insurance coverage product;
combine the selected plurality of the components from the first and second sets within constraints of the properties and values of the individual components to create a combination of components, wherein said selection or combination are performed in accordance with a component rule associated with at least one of the selected components; and present an insurance coverage policy for the user based on the combination of components.

2. The automated processing system of claim 1, wherein each of said components are self-descriptive having one or more data elements providing a descriptive text of said component.

3. The automated processing system of claim 1, wherein the component rule comprises a compositional rule defining how a first component may be selected if a second component has already been selected.

4. The automated processing system of claim 1, wherein the component rule comprises an availability rule defining whether a component is available for use in said insurance coverage.

5. The automated processing system of claim 4, wherein said availability rule defines when a component may be selected for use.

6. The automated processing system of claim 1, wherein the component rule comprises a rule defining how information is to be mapped to an insurance product template.

7. The automated processing system of claim 1, wherein at least one of the one or more properties associated with each of the plurality of components is used in a premium calculation process.

8. The automated processing system of claim 7, wherein said premium calculation process further comprises identifying a relevant individual rating process based on said properties associated with each of the plurality of components and performing said relevant individual rating process to price a premium of an insurance product including each component, alone and in combination with other components.

9. The automated processing system of claim 7, wherein said premium calculation process further comprises identifying a relevant individual pricing process based on said properties associated with each of the plurality of components and performing said relevant individual pricing processes to adjust a premium of an insurance product including each component, alone and in combination with other components.

10. The automated processing system of claim 1, wherein a first component of the insurance coverage policy is associated with a first type of insurance and a second component of the insurance coverage policy is associated with a second type of insurance different than the first.

11. The automated processing system of claim 1, wherein execution of the instructions further results in a validation of the set of selected components.

12. The automated processing system of claim 11, wherein said validation includes execution of a first component rule, associated with a first component, and at least one associated property, attribute, or value associated with a second component.

13. The automated processing system of claim 1, wherein said processor is associated with a component selection platform that consumes a pricing data model.

14. The automated processing system of claim 1, wherein said presenting is associated with a transmission of data to or storage of data in a remote device via a communication network.

15. A system, comprising:

a product data model storage apparatus storing multiple individually selectable inter-related insurance components, wherein none of the inter-related insurance components are stand alone insurance coverages and at least some of the multiple inter-related insurance components are pre-filed with and approved by a regulatory entity having regulatory jurisdiction regarding the insurance coverage and include: a covered property component, a property not covered component, a covered cause of loss component, an exclusion component, a deductible component, and a definition component;

the product data model storage apparatus further storing, for each inter-related insurance component, a component name, language text, and product rules for the inter-related insurance component, wherein at least one product rule defines a mapping of the language text to a form section of an insurance policy template;

a selection system coupled to the product data model storage apparatus, the selection system being adapted to facilitate selection of a set of components by a user, wherein the selection system is to:

display to the user a first set of potential components via a graphical user interface, facilitate individual selection of a plurality of the components from the first set by the user to include in an insurance coverage product, automatically retrieve and execute at least one rule associated with the selected components, based upon execution of the rule, automatically display a second set of potential components to the user, the second set of components being further determined based on the set of selected components and information the user providing the selection, and facilitate individual selection of a plurality of the components from the second set by the user to include in the insurance coverage product;

a rating engine coupled to the selection system and to the product data model, the rating engine being adapted to generate an overall premium based on the set of components selected by the user; and a policy issuance system coupled to the rating engine and to the product data model, the policy issuance system being adapted to publish an insurance policy based on the set of components selected by the user, wherein the published insurance policy includes the language text of each component selected by the user located within the policy in accordance with the associated product rule.

16. The system of claim 15, wherein the user is associated with an insurance consumer.

17. The system of claim 16, further comprising a recommendation engine to recommend at least one component to the user based at least in part on execution of a first component rule, associated with a first component, and at least one associated property, attribute, or value associated with a second component.

18. The system of claim 16, wherein said policy issuance system is adapted to transmit data to or store data in a remote device via a communication network.

19. The system of claim 16, wherein a first component of the insurance coverage policy is associated with a first type of insurance and a second component of the insurance coverage policy is associated with a second type of insurance different than the first.

20. A computer-implemented method, comprising:

determining a plurality of individually selectable insurance components combining to form an insurance product, wherein none of the insurance components are stand alone insurance coverages and at least some of the plurality of insurance components are pre-filed with and approved by a regulatory entity having regulatory jurisdiction regarding the insurance coverage and include: a covered property component, a property not covered component, a covered cause of loss component, an exclusion component, a deductible component, and a definition component, wherein at least some insurance components include at least one product rule associating the insurance component with a required definition;

display to a user a first set of potential components via a graphical user interface;

facilitate individual selection of a plurality of the components from the first set by the user to include in an insurance coverage product;

automatically retrieve and execute at least one rule associated with the selected components;

based upon execution of the rule, automatically display a second set of potential components to the user via the graphical user interface, the second set of components being further determined based on the set of selected components and information about the user providing the selection;

facilitate individual selection of a plurality of the components from the second set by the user to include in the insurance coverage product;

combine the selected plurality of the components from the first and second sets within constraints of the properties and values of the individual components to create a combination of components, wherein said selection or combination are performed in accordance with a component rule associated with at least one of the selected components;

automatically determining by a processor a rating property and value individually associated with each of the plurality of insurance components combining to form the insurance product;

determining customer characteristics impacting the insurance product;

calculating a premium based on a combination of the one or more components and their associated rating property and value and the customer characteristics; and publishing an insurance policy for the insurance product based on the combination of the one or more components, wherein the insurance policy includes the premium and appropriate definitions as required by the product rules of those components.

21. The method of claim 20, further comprising determining a final premium for an individualized insured coverage offering.

22. The method of claim 20, wherein said determining the plurality of insurance components includes receiving indications of selected components from an insurance agent associated with the customer.

23. The method of claim 20, further comprising:
automatically generating, by a billing system, a bill based on the calculated premium associated with the insurance product.

24. The method of claim 20, further comprising:
automatically processing, by a claims system, an insurance claim in accordance with the determined plurality of insurance components.

25. The method of claim 20, wherein at least one of said components is a life insurance component and at least one of said components is a property and casualty component.

26. A non-transitory computer-readable medium storing instructions adapted to be executed by a processor to perform a method, said method comprising:
defining a plurality of individually selectable components of an insurance coverage, each of the defined plurality of components having one or more associated properties defining attributes and one or more values associated with the properties, wherein the defined plurality of components are not stand alone insurance coverages and further wherein the at least some of the defined plurality of components are pre-filed with and approved by a regulatory entity having regulatory jurisdiction regarding the insurance coverage and include at least all of: a covered property component, a property not covered component, a covered cause of loss component, an exclusion component, a deductible component, and a definition component;

displaying to a user a first set of potential components via a graphical user interface;

facilitating individual selection of a plurality of the components from the first set by the user to include in an insurance coverage product;

automatically retrieving and executing at least one rule associated with the selected components;

based upon execution of the rule, automatically displaying a second set of potential components to the user via the graphical user interface, the second set of components being further determined based on the set of selected components and information about the user providing the selection;

facilitating individual selection of a plurality of the components from the second set by the user to include in the insurance coverage product;

combining the plurality of the selected plurality of components within constraints of the properties and values of individual components to create a combination of components, wherein said selection or combination are performed in accordance with a component rule; and presenting an insurance coverage policy based on the combination of components.

27. The computer-readable medium of claim 26, wherein each of said components are self-descriptive having one or more data elements providing a descriptive text of said component.

28. The computer-readable medium of claim 26, wherein the component rule comprises a rule defining how a first component may be selected if a second component has already been selected.

* * * * *